US007634390B2

(12) United States Patent
Choi

(10) Patent No.: US 7,634,390 B2
(45) Date of Patent: Dec. 15, 2009

(54) PAN COATING SIMULATION FOR DETERMINING TABLET COATING UNIFORMITY

(75) Inventor: Michael Choi, North Wales, PA (US)

(73) Assignee: Particle Coating Technology Solutions, Inc., Montgomeryville, PA (US)

( * ) Notice: Subject to any disclaimer, the term of this patent is extended or adjusted under 35 U.S.C. 154(b) by 724 days.

(21) Appl. No.: 10/981,812

(22) Filed: Nov. 5, 2004

(65) Prior Publication Data
US 2006/0100786 A1    May 11, 2006

(51) Int. Cl.
G06G 7/58     (2006.01)
G01N 33/15    (2006.01)
A61K 9/54     (2006.01)

(52) U.S. Cl. .............................. 703/2; 703/12; 702/27; 427/2.18

(58) Field of Classification Search ........................ None
See application file for complete search history.

(56) References Cited

U.S. PATENT DOCUMENTS

| 5,211,985 A | 5/1993 | Shirley, Jr. et al. |
| 6,209,259 B1 | 4/2001 | Madigan et al. |
| 6,256,597 B1 | 7/2001 | Wang et al. |
| 6,692,571 B2 | 2/2004 | Jones et al. |

OTHER PUBLICATIONS

Denis et al. Powder Tech., 2003, 130, 174-180.*
Rubinstein, R., Simulation and the Monte Carlo Method, p. 1-19, John Wiley & Sons 1981.*
Denis et al., Power Tech., A Model of Surface Renewal with Application to the Coating of Pharmaceutical Tablets in Rotary Drums, 2003, 130, 174-180.*
Rubinstein, Systems, Models, Simulation and the Monet Carlo Methods, p. 1-19, John Wiley & Sons, 1981.*
Yamane et al., Pharmaceutical Research, Computer Simulation of Tablet Motion in Coating Drum, 1995, 12,1264-1268.*
Sandadi et al., Chemical Engineering Science, In Situ, Near Real-time Acquisition of Particle Motion in Rotating Pan Coating Equipment Using Imaging Techniques, 2004, 59, 5807-5817.*
Shelukar et al., Identification and characterization of factors controlling tablet coating uniformity in a Wurster coating process, Powder Technology, 2000, 110, 29-36.*
Reuven Y. Rubinstein, Simulation and the Monte Carlo Method, pp. 1-19, John Wiley & Sons 1981.

(Continued)

Primary Examiner—Marjorie Moran
Assistant Examiner—Larry D Riggs, II
(74) Attorney, Agent, or Firm—RatnerPrestia

(57) ABSTRACT

A method and computer program product for simulating a pan coating process estimates at least one of tablet coating uniformity or coated tablet weight uniformity for tablets within a tablet bed of a pan. The simulation includes obtaining a plurality of parameters associated with the pan coating process, selecting tablet paths for each cycle of a simulation tablet in the tablet bed, determining a coating amounts for the tablet based on selected tablet paths, determining cycle times for the tablet, and summing the determined coating amounts and cycle times for the tablet. The simulation is repeated for each of a defined number of simulation tablets representing the tablets within the tablet bed to determine tablet coating uniformity and/or coated tablet weight uniformity for the tablets. Tablet paths and/or cycle times are determined randomly, e.g., in accordance with a Monte Carlo method.

31 Claims, 10 Drawing Sheets

OTHER PUBLICATIONS

Uzi Mann, Analysis of Spouted-Bed Coating and Granulation. 1. Batch Operation, Ind. Eng. Chem, Process Des. Dev. vol. 22, No. 2, 1983, pp. 288-292.

Michael M.S. Choi and Axel Meisen, Sulphur Coating of Urea in Shallow Spouted Beds, 1995, pp. 1-60.

Cheng et al., "The Prediction of Variability Occurring in Fluidized Bed Coating Equipment. II. The Role of Nonuniform Particle Coverage as Particles Pass Through the Spray Zone", Pharmaceutical Development and Technology, 5(3), pp. 323-332 (2000).

Choi et al., "Sulfur coating of urea in shallow spouted beds", Chem. Eng. vol. 52, No. 7, pp. 1073-1086 (1997).

International Search Report for PCT International Application No. PCT/US05/39624 mailed Dec. 15, 2006.

* cited by examiner

PAN COATING SIMULATION FOR DETERMINING TABLET COATING UNIFORMITY

FIELD OF THE INVENTION

The present invention relates to the field of tablet coating and, more particularly, to simulation methods and apparatus for determining tablet coating uniformity in pan coating processes.

BACKGROUND OF THE INVENTION

Pan coating processes are routinely used to apply coating to tablets. Typically, a batch of tablets is loaded into a drum (referred to herein as a pan) and a liquid solution, dispersion, or suspension containing coating material (referred to herein as coating solution) is applied to the tablets as the pan rotates in order to coat the tablets. In the pharmaceutical industry, the pan is typically perforated and, thus, the pan is commonly referred to as a perforated pan. The coating uniformity of the tablets is based on a number of variables such as the design of the pan, pan rotation speed, baffle design within the pan, number of tablets, tablet size, tablet shape, and atomization and distribution of the coating solution. Coating uniformity among the tablets being coated is a fundamental goal of the coating process. Due to the complexity of atomization and distribution of the coating solution, tablet circulation patterns, and processing variables associated with the coating process, it is difficult to accurately predict coating uniformity.

Uniformity of coating from tablet-to-tablet (referred to herein as "coating uniformity") is desirable in coating processes and is essential for drug layering (i.e., coating active pharmaceutical ingredients onto tablets). Coating uniformity for a pan coating process may be examined experimentally using test batches of tablets. In this approach, a test batch of tablets is loaded into the pan of a pan coating apparatus. The test batch is then coated for a predetermined period of time. Coated tablets within the test batch are sampled at various times to determine if the level of coating uniformity among the sampled tablets is acceptable. If the level of coating uniformity is unacceptable, the process is repeated using another test batch of tablets. All test batches are typically discarded.

Typically, tablets and coating solutions that will be used during production are also used during testing. The tablets often include expensive pharmaceutical drugs. In addition, the coating solution may include expensive pharmaceutical drugs as well. Accordingly, discarding test batches including these drugs is expensive.

Additionally, the test batches (which may be manufactured in actual production equipment or pilot/lab-scale equipment) typically include fewer tablets than a production batch of tablets being coated for market distribution. Therefore, the results obtained from the test batches are extrapolated to predict coating uniformity for the number of tablets in the production batches. Existing techniques for extrapolating test batch data to predict coating uniformity for production batches are imprecise, which leads to discrepancies between the predicted coating uniformity and the actual coating uniformity of the production batches. If the discrepancy is too great for a particular production batch, that batch is discarded and the pan coating process is modified. The pan coating process may need several modifications to obtain an acceptable production batch of tablets.

The use of production tablets and coating solutions during testing and the amount of time required for testing and modifying the pan coating process for production contribute to the total costs associated with the production of coated tablets. Additionally, the amount of time required for testing delays entry of the production tablets into the market place, where each day of delay potentially results in a large amount of lost revenue. There is an ever present desire to reduce costs associated with the production of coated tablets and to reduce the amount of time needed to introduce production tablets to the market place. Accordingly, methods and computer program products for determining coating uniformity that are not subject to these limitations are needed. The present invention addresses this need among others.

SUMMARY OF THE INVENTION

The present invention is embodied in methods and computer program products for simulating a pan coating process to estimate tablet coating uniformity and/or coated tablet weight uniformity for tablets. The pan coating process cycles the tablets within a tablet bed in a pan.

In an exemplary embodiment, tablet coating and/or coated tablet weight uniformity are determined by obtaining a plurality of parameters associated with the pan coating process including a tablet path distribution corresponding to the tablet bed, randomly selecting a tablet path for each cycle of a simulation tablet within the tablet bed in accordance with the tablet path distribution, calculating a coating amount for at least one cycle of the simulation tablet based on the selected tablet path, and summing the calculated coating amounts for at least one cycle of the simulation tablet to produce a tablet coating weight. These steps are repeated for each of a defined number of simulation tablets representing the tablets in the tablet bed to determine tablet coating uniformity and/or coated tablet weight uniformity. In addition, a cycle time may be randomly selected for each cycle of a simulation tablet and a total cycle time for the simulation tablet may be compared to a desired coating time to determine the number of cycles for each tablet such that the tablet coating weight for a simulation tablet is further based on the number of cycles of that simulation tablet.

In an alternative exemplary embodiment, tablet coating and/or coated tablet weight uniformity are determined by obtaining parameters associated with the pan coating process including a desired coating time and a cycle time distribution, randomly assigning a cycle time to each cycle of a simulation tablet in accordance with the cycle time distribution, and summing the cycle times assigned to each cycle until the summed cycle times is greater than or equal to the desired coating time. In addition, a tablet coating weight is determined for each simulation tablet based on the number of cycles. These steps are repeated for each of a defined number of simulation tablets representing the tablets in the tablet bed to determine tablet coating uniformity and/or coated tablet weight uniformity. In addition, a tablet path may be randomly selected within the tablet bed for each cycle of a simulation tablet, with the tablet coating weight being based further on the random tablet path selection.

In an exemplary embodiment, the random selection steps result in a simulation method for the pan coating process that is in accordance with a Monte Carlo method.

BRIEF DESCRIPTION OF THE DRAWINGS (IF APPLICABLE)

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale. On the contrary, the dimensions of the various features are arbitrarily expanded or reduced for clarity. Included in the drawings are the following figures:

DETAILED DESCRIPTION OF THE INVENTION

Figure 1A:
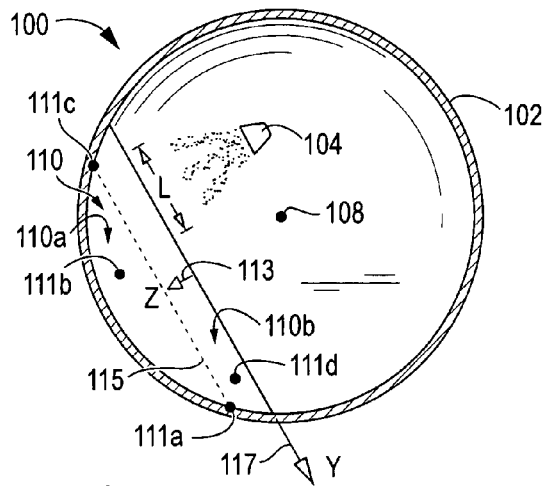
FIG. 1A is a cross-sectional planar view of components of an exemplary pan coating apparatus viewed axially (i.e., along an axis of rotation) for use in describing the present invention.
Figure 1B:
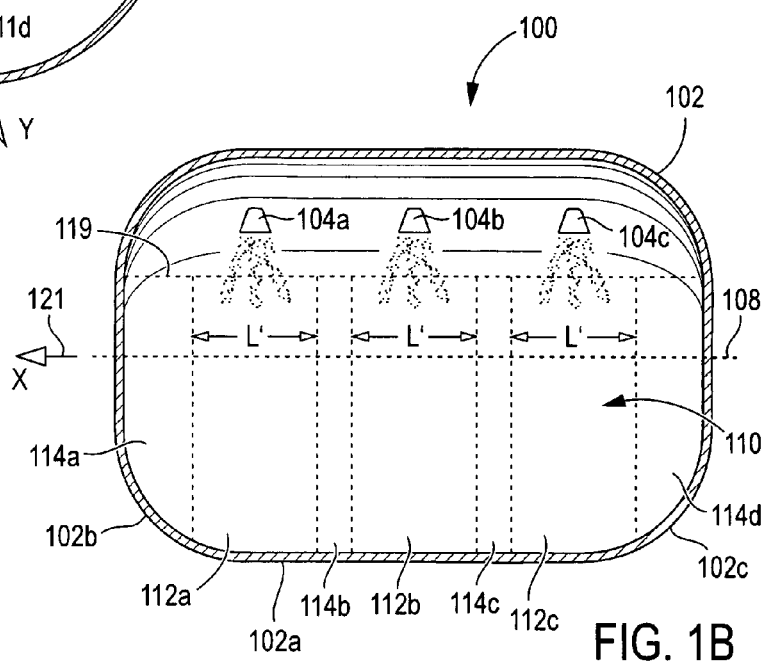
FIG. 1B is a cross-sectional planar view of the exemplary pan coating apparatus of FIG. 1A viewed radially (i.e., perpendicular to the axis of rotation) for use in describing the present invention.
Figure 1C:
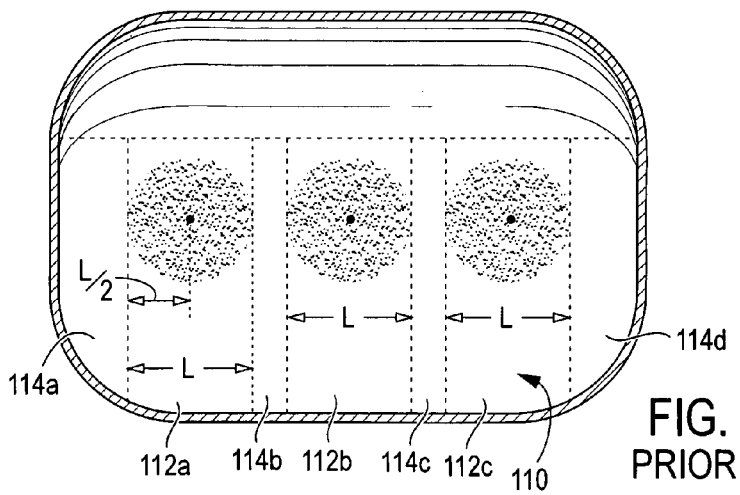
FIG. 1C is a cross-sectional planar view of the exemplary pan coating apparatus of FIG. 1A viewed perpendicular to the surface of the tablet bed.

FIGS. 1A-1C depict an exemplary pan coating apparatus 100 for applying a coating material to a plurality of tablets that is useful for setting forth the terminology used to describe the present invention. The exemplary pan coating apparatus 100 includes a pan 102 for receiving the plurality of tablets and one or more nozzles for delivering coating solution to the tablets (represented by nozzle 104 in FIG. 1A and nozzles 104a-c in FIG. 1B). FIG. 1A depicts a cross-sectional view of the pan 100 along the axis of rotation 108 and FIG. 1B depicts a cross-sectional view of the pan 102 perpendicular to the axis of rotation 108.

The plurality of tablets are inserted into the pan 102 of the pan coating apparatus 100 to form a tablet bed 110 within the pan 102. The pan 102 may be fully perforated, partially perforated, or solid (i.e., no perforations). The pan 102 typically includes a cylindrical portion 102a and, optionally, one or more non-cylindrical portions (e.g., dished ends 102b and 102c as illustrated in FIG. 1B or cone ends). Baffles (not shown) within the pan 102 are commonly used to thoroughly mix the tablets (e.g., in a radial and/or axial direction). The rate of mixing directly impacts coating uniformity and is determined by the rotational speed of the pan 102 about the axis of rotation 108, the design of the baffles (if present), the volume of the tablet bed 110, and properties of the tablets.

As the pan 102 rotates, the tablets move within the tablet bed 110 such that the tablets travel from the bottom of the tablet bed (e.g., at position 111a), through a generally upward traveling tablet region 110a of the tablet bed 110 (e.g., at position 111b) due to the rotation of the pan 102, to the top of the tablet bed 110 (e.g., at position 111c), which is represented by dashed line 119 in FIG. 1B. The tablets then travel through a generally downward traveling tablet region 110b (e.g., at position 111d) back to the bottom of the tablet bed 110. The illustration of the tablet bed 110 and the upward and downward traveling tablet regions 110a and 110b within the bed 110 (which are separated by a dashed line 115) is for descriptive purposes only with the actual tablet bed and regions potentially varying significantly from the illustrated tablet bed and regions.

The movement of a tablet from the bottom of the tablet bed 110 to the top of the tablet bed 110 and back is referred to herein as a cycle. The average cycle time ($t_{cyc}$) for the tablets may be calculated using equation 1:

$$t_{cyc} = \frac{B}{P * R * (1 - S)} \quad (1)$$

where B is the perimeter of the tablet bed 110, P is the perimeter of the pan 102, R is the rotational speed of the pan 102 about the axis of rotation 108, and S is the slip (or slip factor) between the tablet bed 110 and the pan 102. Slip may be impacted by the geometry of the pan 102 and, if present, the baffles within the pan 102. Additionally, tablet size, shape, surface roughness, and surface tackiness may impact the slip.

The nozzles 104 dispense coating solution onto the tablet bed 110 over a distance (L) in a y-direction (indicated in FIG. 1A by arrow 117) and a distance (L') in an x-direction (indicated in FIG. 1A by arrow 121). In an exemplary embodiment, three nozzles 104 are positioned axially above the tablet bed 110 near the axis of rotation 108. Typically, the nozzles are substantially similar and dispense coating material in a circular pattern (as depicted in FIG. 1C) or oval pattern. The distances L and L' will be at least substantially equal for the circular pattern (i.e., having a radius of L/2) but may be markedly different for the oval pattern depending on the width-to-length ratio and the spray angles in the x and y directions. The nozzles are designed and positioned to spray a coating solution (e.g., coating material and solvent) onto the surface of the tablet bed 110 in spray zones (represented by actual spray zones 112a-c) as the pan 102 rotates. Areas of the tablet bed 110 that are not subject to the coating solution spray are referred to as bypass zones (represented by actual bypass zones 114a-d).

A tablet that passes through a bypass zone during a cycle does not receive any coating solution for that cycle. Further, the position of a tablet within a spray zone perpendicular to the surface of the tablet bed 110 (i.e., in the z-direction indicated in FIG. 1A by arrow 113) within the downward traveling tablet region 110b affects the amount of coating solution that tablet receives. For example, tablets near the surface of the tablet bed 110 receive more coating solution than tablets further from the surface of the tablet bed 110. Similarly, the concentration of spray droplets may vary from the center of a spray zone to the edge of the spray zone. Thus, tablets passing through the center of the spray may receive more coating than the tablets passing through the edge of the spray.

In an exemplary embodiment, the nozzles 104 atomize the coating solution to create fine droplets of coating solution for deposition onto the surface of the tablet bed 110. Coating uniformity is affected by the distribution of the coating solution spray droplets onto the surface of the tablet bed and the penetration of the coating solution into the tablet bed. The distribution of droplets is impacted by the number of nozzles 104, atomization of the coating solution, process air flow pattern, process air flow rate, nozzle design, nozzle setup, and nozzle position above the tablet bed 110. Penetration of the coating solution is impacted by distribution of the droplet size, tablet size, tablet shape, and tablet bed porosity.

In an exemplary embodiment, as the tablets cycle within the tablet bed 110, the pan coating apparatus 100 forces air through the tablet bed 110 (e.g., for a partially perforated or fully perforated pan). The air flow through the tablet bed 110 provides air-tablet contact for removing residual solvent from the coating solution, leaving coating material for coating the tablets. Tackiness of the coating solution is a function of the formulation of the coating solution and the drying conditions in the tablet bed and may impact tablet motion within the bed, which can impact mixing rate and coating uniformity.

Figure 2:
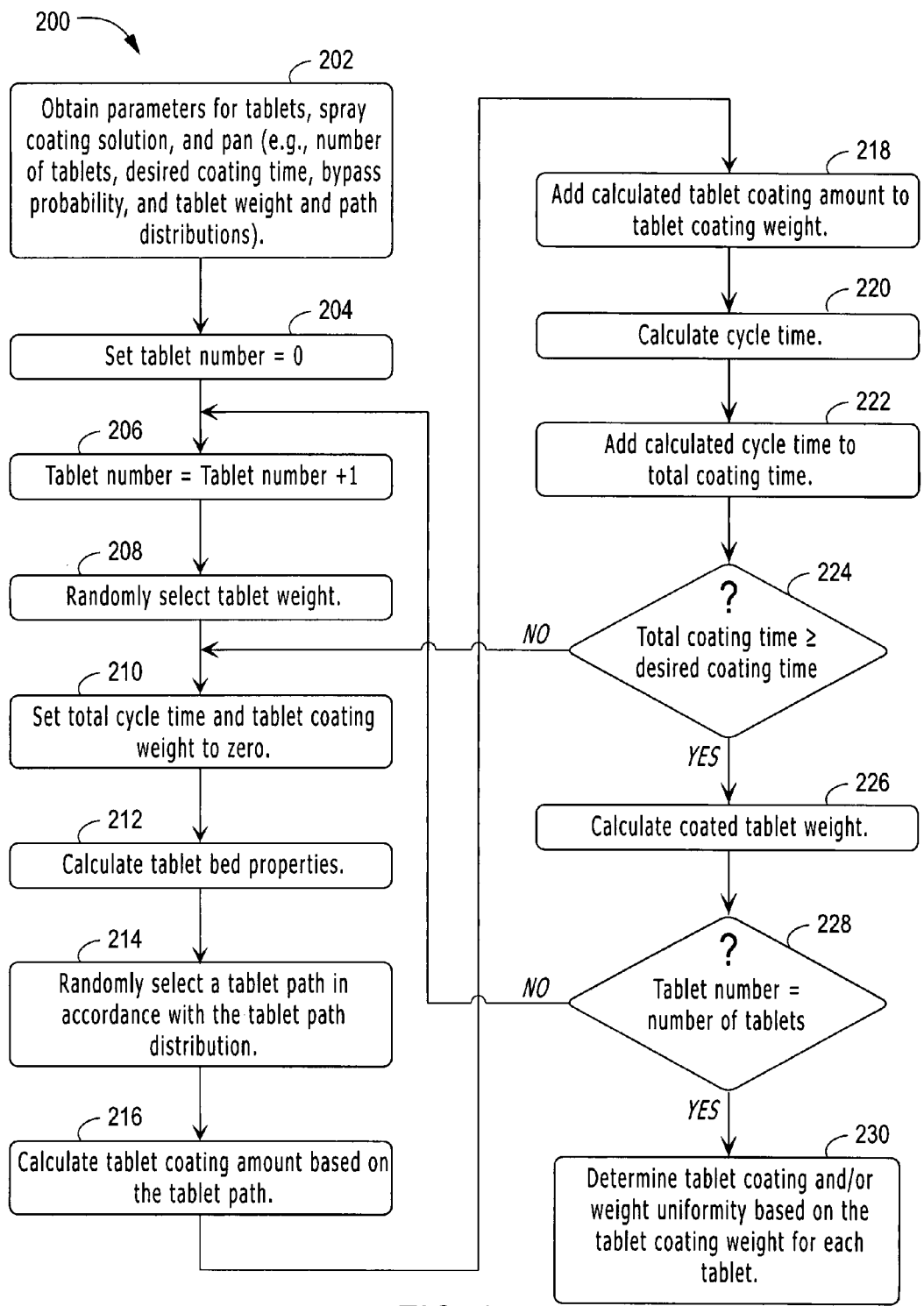
FIG. 2 is a flow chart of exemplary steps for predicting tablet coating uniformity for a pan coating process.

FIG. 2 depicts a flow chart 200 of exemplary steps for simulating a pan coating process to determine tablet coating uniformity and/or coated tablet weight uniformity in accordance with the present invention. In general overview, at block 202, a plurality of parameters associated with the pan coating process are obtained. At blocks 204-228, coating amounts are determined for simulation tablets representing the plurality of tablets based on the plurality of parameters to produce a tablet coating weight. At block 230, tablet coating and/or coated tablet weight uniformity is determined for the plurality of tablets based on the tablet coating weight for each of the simulation tablets.

Exemplary steps for simulating a pan coating process to determine tablet coating and/or coated tablet weight uniformity are now described in detail. At block 202, parameters associated with a pan coating process are obtained, e.g., parameters associated with the tablets, the spray coating solution, and/or the pan. For example, the parameters may include a desired number of tablets for simulation (herein simulation tablets), a desired coating time, a bypass distribution, and tablet weight and tablet path distributions.

The number of simulation tablets may be less than, greater than, or equal to the total number of tablets represented in the tablet bed. The number of simulation tablets may be based on the amount of time available and the accuracy desired. Increasing the number of simulation tablets increases accuracy, but also increases simulation time. Conversely, decreasing the number of simulation tablets reduces accuracy, but decreases simulation time.

The parameters may be obtained directly, e.g., from a computer memory or from a user via a graphical user interface (GUI), which is discussed in further detail below, or through calculations based on directly obtained parameters and/or other calculated parameters. For example, the number of tablets for simulation may be obtained directly from a GUI input; or if a total quantity of coating solution and an average spray rate are obtained directly from the GUI input, desired coating time may be calculated by dividing the total quantity of coating solution by the average spray rate.

Other exemplary input parameters may include, by way of non-limiting example, coating pan model (which may be linked to other parameters such as pan shape to automatically retrieve these parameters), pan rotation speed, total load weight of uncoated tablets, tablet size, tablet bed density (i.e., bulk density), tablet density, tablet shape factor, tablet bypass probability, solids loading of solution, delivery rate, and total delivery quantity. Additionally, the input parameters may include desired coated tablet properties. In the illustrated embodiment, the desired or actual coated tablet properties include product yield (e.g., in kg), bulk density (e.g., in $kg/m^3$), and tablet density (e.g., in $kg/m^3$).

At block 204, a tablet number variable is initialized (e.g., set to zero) and, at block 206, the tablet number variable is incremented (e.g., increased by one) to reflect the current tablet being simulated.

At block 208, a tablet weight is selected. The tablet weight represents the initial weight of the tablets prior to receiving any coating. In an exemplary embodiment, the tablet weight is randomly selected, e.g., based on the tablet weight distribution. In an alternative exemplary embodiment, tablet weight may be a constant value supplied as an input parameter. Various other techniques for selecting tablet weight will be understood by one of skill in the art from the description herein and are considered within the scope of the present invention. Tablet weight is used in determining coated tablet weight uniformity and, thus, this step may be omitted if coated tablet weight uniformity is not determined.

At block 210, a total cycle time variable and a tablet coating weight variable are initialized (e.g., set to zero). The total cycle time represents the total amount of time the current tablet has cycled within the tablet bed and the tablet coating weight represents the total amount of coating the current tablet has received during that time.

At block 212, tablet bed properties are calculated. In an exemplary embodiment, the tablet bed is dynamic, e.g., it grows as coating material is added to the tablets. During coating of the tablets, the coating applied to the tablets increases the volume and mass of the tablet bed within the pan. In an exemplary embodiment, the simulation of the present invention accommodates for these changes by adjusting the parameters during the desired coating time, e.g., based on parameters supplied via a GUI interface. Parameters such as slip factor, bypass distribution, and coated tablet shape may be adjusted based on target coated tablet properties such as product yield, bulk density, and tablet density. In an alternative exemplary embodiment, the tablet bed is static in size and, thus, this step may be performed once prior to running the simulation with the calculated tablet bed properties reused throughout the simulation.

At block 214, a tablet path $S_i$ is randomly selected for the current cycle in accordance with the tablet path distribution. In an exemplary embodiment, the tablet path is a path from the top of the tablet bed to the bottom of the tablet bed (optionally fixed in the x-direction) at a randomly selected position within the tablet bed perpendicular to the surface of the tablet bed (i.e., in the z-direction). The tablet path distribution may be a random distribution based at least in part on the volume of the tablet bed.

In an exemplary embodiment, calculations for determining a volume based distribution are based on a tablet bed within a cylinder shaped pan. In an alternative exemplary embodiment, calculations for determining a volume based distribution are based on a tablet bed within a pan having one or more cylindrical portions and one or more non-cylindrical portions. The non-cylindrical portions may be on the ends of the pan, e.g., dished ends (such as illustrated in FIG. 1A) or conical ends. The shape of the pan may be input directly or may be associated with a particular model of a known pan coating apparatus, which may be selected from a menu of a GUI. Pan coating models may be customized with pan coating apparatus parameters that are automatically selected when a user selects that particular model. In an exemplary embodiment, the size of the tablet bed is determined by calculating the size of the tablet bed corresponding to the cylindrical portion(s) and the size of the tablet bed corresponding to the non-cylindrical portion(s). The calculated portions are then combined.

At block 216, a tablet coating amount (e.g., coating weight) for the current cycle is determined. In an exemplary embodiment, the tablet coating weight per cycle (M) is calculated by integrating a tablet coating solution deposition for the simulation tablet along the selected tablet path $S_l$ (see block 214) using an efficiency equation such as shown in equation 2:

$$M = \int_{S_l} C_l \cdot v_z \cdot \eta \cdot A_p \cdot \frac{dl}{v_l} \quad (2)$$

where $C_l$ is the mass concentration of coating material in the spray (herein referred to as spray concentration), $v_z$ is the spray droplet velocity, $\eta$ is the deposition efficiency, $A_p$ is the projected area of the tablet, and $v_l$ is the tablet velocity in the l direction on its path $S_l$. To solve equation 2, empirical correlations are developed for the variables in a manner that will be understood by one of skill in the art. For example, tablet velocity through the spray zone, $v_l$, may be measured directly from experiments. Equation 2 is then solved using the empirical correlations to yield the coating amount per cycle (M).

In an exemplary embodiment, $C_l$ in equation 2 is determined through equation 3:

$$C_l = C_{x,y,z} = C_{x,y,0} \cdot \exp\left(-\frac{1.5 \cdot (1-\varepsilon)}{d_v \psi \varepsilon} \cdot z\right) \quad (3)$$

where $C_{x,y,0}$ is the spray concentration at the surface of the bed, $\varepsilon$ is the loose-packed void fraction of the bed, $d_v$ is the diameter of a sphere having the same volume at the tablet, $\psi$ is the surface area of a sphere having the same volume at the tablet divided by the surface area of the tablet, and z is the tablet path selected in the step of block 210. The spray concentration at the surface of the tablet bed, $C_{x,y,0}$, may be measured directly by sampling the spray rate at a given location in the spray. Slip information may be obtained from the average cycle time measured using a tracer technique such as described in *A Photometric Analysis of Tablet Movement in a Side-vented Perforated Pan (Accela-cota)* by T. M. Leaver et al. published in J Pharm Pharmacol, 37, pp 17-21, 1994 and in *Positron Emission Particle Tracking Studies* by S. Fitzpatrick et al. published in Pharm Tech, pp 70-78, September, 2003. All other parameters may be obtained/calculated in a manner that will be understood by one of skill in the art. The coating material received per pass is then determined by substituting the result of equation 3 and the supplied parameters to solve equation 2.

In an alternative exemplary embodiment, the coating amount is a constant and, thus, the step of blocks 214 can be omitted and the step of block 216 is not based on tablet path. In accordance with this embodiment, differences in tablet coating weights may be primarily dependent on cycle time, which affects the number of cycles a tablet makes during the desired coating time and is described in detail below.

At block 218, the tablet coating amount determined at block 216 is added to the tablet coating weight for that tablet. In an exemplary embodiment, each time a tablet coating amount is calculated it is added to the tablet coating weight such that the coating amounts calculated for each cycle of the tablet are summed.

At block 220, a cycle time for the current cycle is calculated. In an exemplary embodiment, the cycle time is randomly assigned in accordance with a cycle time distribution obtained at block 202. The cycle time distribution may be in accordance with the exponential function used to describe cycle time distribution set forth in Statistical Methods by Donald L. Harnett published by Addison-Wesley (1982) or calculated from experimental correlations. Example experimental methods of determining cycle time distributions are given in *Identification and Characterization of Factors Controlling Tablet Coating Uniformity in a Wurster Coating Process* by Shelukar et. al. published in Powder Technology, 110 (2000), or the cycle time distribution set forth in *The Prediction of Variability Occurring in Fluidized bed Coating Equipment-Parts 1 and 2* by Cheng et. at. published in Pharmaceutical Development and Technology (2000). In an alternative exemplary embodiment, the average cycle time may be a constant cycle time calculated according to equation 1.

At block 222, the calculated cycle time (see block 220) is added to the total cycle time and, at block 224, the total cycle time is compared to the desired coating time. If the total cycle time is greater than or equal to the desired coating time (indicating that the simulation for the current tablet is complete), processing proceeds at block 226. Conversely, if the total coating time is less than the desired coating time (indicating that the simulation for the current tablet is not complete), processing proceeds at block 210 with the steps of blocks 210-222 repeated until the total cycle time is greater than or equal to the desired coating time. Together, the steps of blocks 222 and 224 may be used to identify a total number of cycles for that tablet.

At block 226, a coated tablet weight is calculated. In an exemplary embodiment, the coated tablet weight is calculated by adding the tablet weight selected for the tablet at block 208 and the tablet coating amount determined at block 218. The coated tablet weight is used to determine tablet weight uniformity and, thus, this step may be omitted in embodiments where tablet weight uniformity is not determined.

At block 228, the current tablet number is compared to the desired number of tablets for simulation obtained at block 202. If the tablet number equals the desired number of tablets (indicating the end of the simulation), processing proceeds at block 230. Conversely, if the current tablet number is less than the desired number of tablets (indicating that additional tablets remain for simulation), processing proceeds at block 206 with the steps of blocks 206 through 226 repeated for each of the remaining tablets.

At block 230, tablet coating uniformity and/or weight uniformity are determined based on the tablet coating weight of each tablet. In an exemplary embodiment, the coating uniformity is expressed as a relative standard deviation (RSD). To determine RSD for coating uniformity, first, the average tablet coating weight for the simulated tablets may be determined by summing the tablet coating weight for each simulated tablet and dividing the sum by the number of simulated tablets. Next, the standard deviation for the tablet coating weight among the simulated tablets may be calculated to determine the precision of the average tablet coating weight. The coating uniformity RSD for the simulated tablets may then be obtained by dividing the standard deviation by the average tablet coating weight and multiplying the result by 100 to obtain a percentage. Weight uniformity may be calculated in a similar manner using the coated tablet weights calculated at block 228.

In an exemplary embodiment, the steps of the present invention are performed for one or more desired coating times. The RSD determined for each coating time may then be plotted using conventional techniques and the plotted points can be connected using standard graphing techniques (e.g., a "best fit" curve) to provide a visual representation of the information.

Figure 2A:
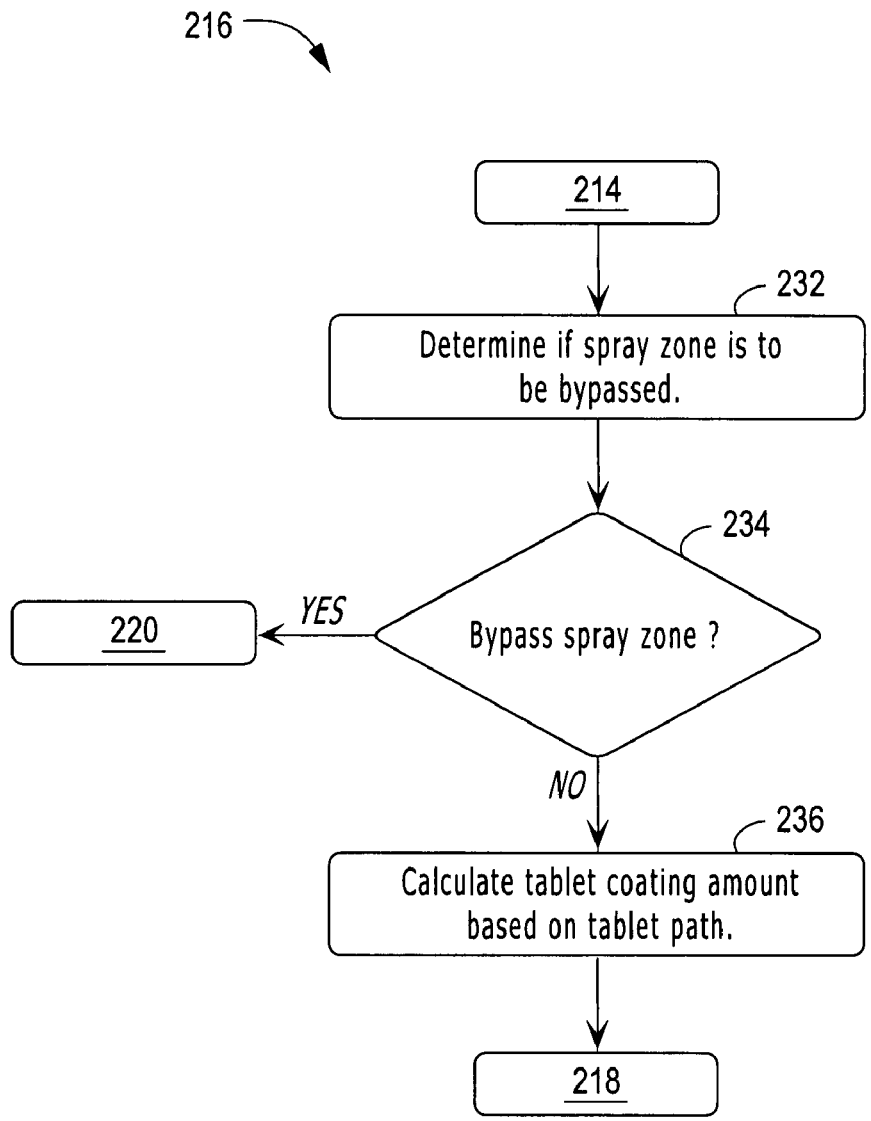
FIG. 2A is a flow chart of alternative exemplary steps for calculating tablet coating amount in the exemplary steps of FIG. 2.

FIG. 2A depicts alternative exemplary steps for selecting a tablet path (block 214 of FIG. 2) and calculating tablet coating amount based on the selected tablet path (block 216 of FIG. 2). In an exemplary embodiment, the tablet path distribution is a random distribution based on the volume of the tablet bed and the tablet path is a path through the tablet bed at a linear distance from the surface of the tablet bed. In this embodiment, the tablet path of block 214 may be selected in the following manner. First, a determination is made regarding the percentage of the tablet bed in which the tablet may reside, e.g., the downward traveling region of the tablet bed, or the top half of the tablet bed by volume. For example, this may be represented by 0.5 to 1.0 with 0.5 representing a midpoint in the tablet bed based on volume and 1.0 representing the surface of the tablet bed. A value between 0.5 and 1.0 can then be randomly selected and converted to a linear distance from the surface of the tablet bed using known geometric calculations to select a tablet path. Thus, in this example, the tablet path distribution is based on a random distribution between 0.5 and 1.0 that represents the downward-moving volume of the tablet bed.

At block 232, a determination is made regarding whether to bypass a simulation spray zone(s) associated with the tablet bed within the pan. In an exemplary embodiment, the determination is made for each cycle of the tablet by randomly selecting whether the tablet passes through the simulation spray zone or bypasses the simulation spray zone in accordance with a tablet bypass probability (or bypass factor), which may be obtained at block 202 of FIG. 1. For example, if the bypass probability is a ten percent (10%), the tablet is selected to pass through the simulation spray zone during 90% of its cycles and to bypass the simulation spray zone during 10% of its cycles.

Compared to the actual spray zones 112a-c (FIGS. 1B and 1C), the simulation spray zones may be equal in width or narrower in width to accommodate variations in coating solution deposited on the surface of the tablet bed. For example, if the spray solution is deposited in circular patterns on the surface of the tablet bed (such as depicted in FIG. 1C), the simulation spray zone may be effectively smaller than the actual spray zone that is being simulated due to the fact that a tablet passing near the edge of a spray zone receives less coating solution than those passing through the middle of a spray zone. Thus, the tablet bypass probability may be adjusted such that a higher percentage of simulation tablets bypass a simulation spray zone than in the actual system being simulated.

In an exemplary embodiment, the tablet bypass probability is calculated by first converting an actual spray distribution on a surface of the tablet bed in an actual system to a coating per cycle distribution (e.g., by dividing the tablet bed into multiple vertical sections). A binary coating per cycle distribution or a Gaussian coating per cycle distribution is then determined that has a standard deviation matching a standard deviation of the coating per cycle distribution. Finally, the tablet bypass probability is calculated based on the determined binary or Gaussian coating per cycle distributions to accurately simulate the actual system.

At block 234, a decision is made regarding the bypass spray zone determination made at block 232. If the current cycle of the tablet is selected to pass through the simulation spray zone, processing proceeds at block 236. Conversely, if the current cycle is selected to bypass the simulation spray zone, block 236 is skipped for the current cycle with the process proceeding at block 220 of FIG. 2.

At block 236, a tablet coating amount (e.g., coating weight) for the current cycle is calculated. In an exemplary embodiment, the tablet coating amount is calculated essentially as described above with reference to block 212 with the exception that no coating amount is calculated for cycles selected to bypass the simulation spray zone. Processing then proceeds at block 218 of FIG. 2.

In an exemplary embodiment, coating amount ($M_{ij}$) for a given cycle (j) and given simulation tablet (i) is calculated according to a derived equation 4:

$$M_{ij} = K \frac{\exp\left(-\frac{1.5 \cdot (1-\varepsilon)}{d_v \psi \varepsilon} z\right)}{D-z} \quad (4)$$

where K is calculated from normalization equation 5:

$$\frac{K}{N_{sim}} \cdot \sum_{i=1}^{N_{sim}} \sum_{j=1}^{N_{cyc}} \frac{\exp\left(-\frac{1.5 \cdot (1-\varepsilon)}{d_v \psi \varepsilon} z\right)}{D-z} = \frac{C_{tot}}{N_{tab}} \quad (5)$$

$N_{sim}$ is the total number of tablets simulated, $N_{cyc}$ is the total number of cycles the ith tablet cycles through the spray zone, $N_{tab}$ is the total number of tablets coated in the batch, $C_{tot}$ is the total amount of coating deposited onto the batch of tablets at the end of the coating process, D is the pan diameter, z is the penetration depth of the spray within the tablet bed, and the other variables are given in the description for equation 3 above. This normalization is applied to maintain continuity in the equation. For example, if 1000 tablets are simulated, the average tablet weight for the simulation tablets will be the same as the average tablet weight in the bed according to equation 5.

By randomly selecting at least one of tablet path, tablet bypass condition, and/or tablet cycle time in the above described methods, the simulation is able to accurately model a pan coating process. In an exemplary embodiment, the one or more random selection and assigning steps are in accordance with a Monte Carlo method. As used herein, the phrase Monte Carlo method is in accordance with the description and definitions presented in Simulation and the Monte Carlo Method by Reuven Y. Rubinstein published by John Wiley & Sons, Inc. (1981), which is incorporated fully herein by reference.

Figure 3:
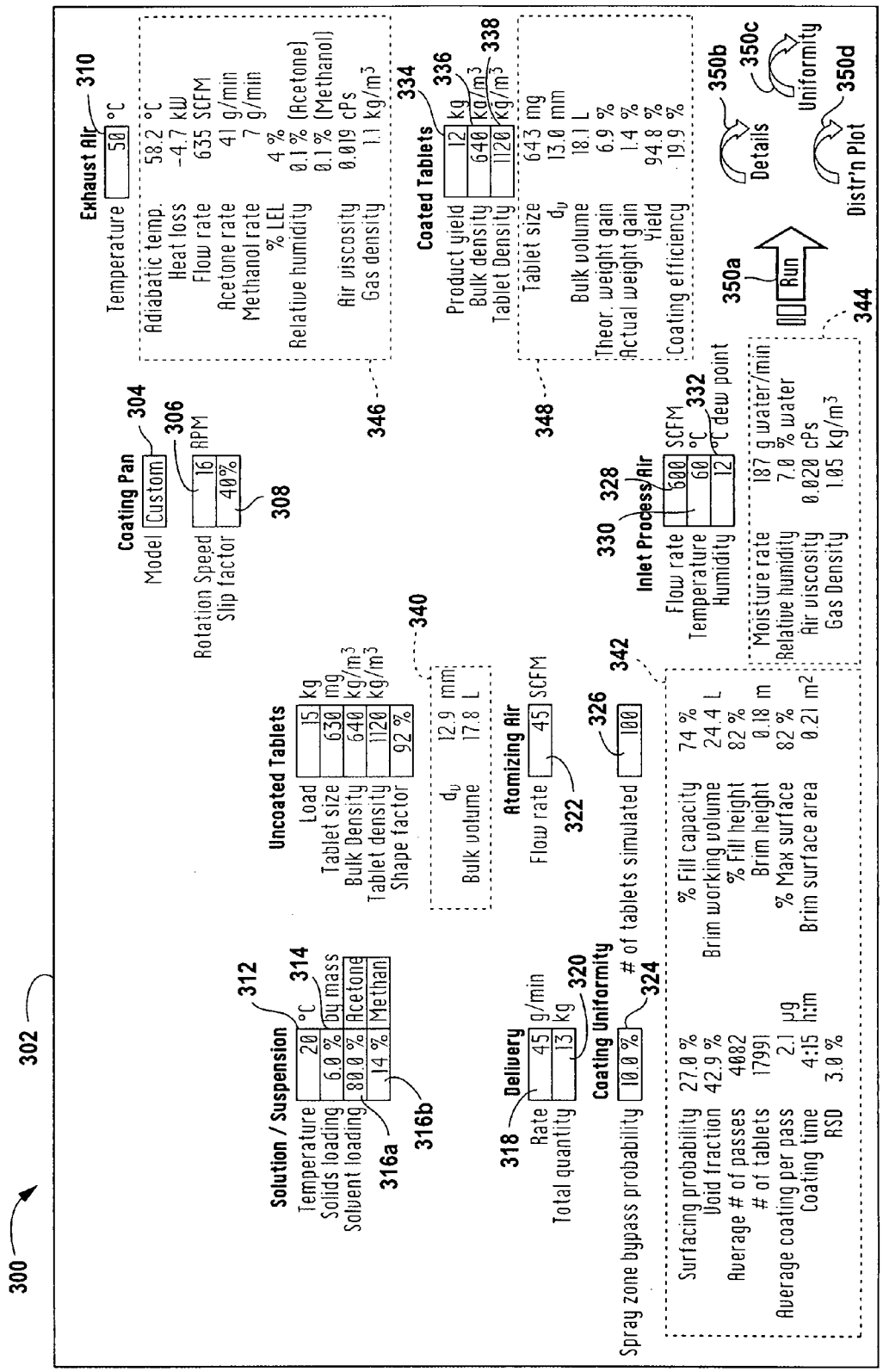
FIG. 3 is an exemplary graphical user interface (GUI) for supplying parameters and viewing information in accordance with the present invention.

FIG. 3 depicts an exemplary graphical user interface (GUI) 300 for display on a screen 302 of a computer (not shown) to obtain parameters. The GUI 300 illustrated in FIG. 3 includes the following: a coating pan model input block 304, a coating pan rotation speed input block 306, a coating pan slip factor input block 308, an exhaust air temperature input block 310, a coating solution temperature input block 312, a coating solution solids loading input block 314, one or more coating solution solvent input blocks (represented by coating solution solvent input blocks 316a and 316b), a coating solution delivery rate input block 318, a coating solution delivery quantity input block 320, a coating solution atomizing air flow rate input block 322, a bypass probability input block 324, a number of tablets simulated input block 326, an inlet process air flow rate input block 328, an inlet process air temperature input block 330, an inlet process air humidity input block 332, a coated tablet product yield input block 334, a coated tablet bulk density input block 336, and a coated tablet density input block 338.

The GUI 300 illustrated in FIG. 3 further includes the following information display areas: an uncoated tablet display area 340, a coating uniformity display area 342, an inlet process air display area 344, an exhaust air display area 346, and a coated tablet display area 348. Additionally, the GUI 300 includes user selection icons, such as icons 350a-d, for initiating a simulation in accordance with the present invention and/or to present other information.

Figure 4:
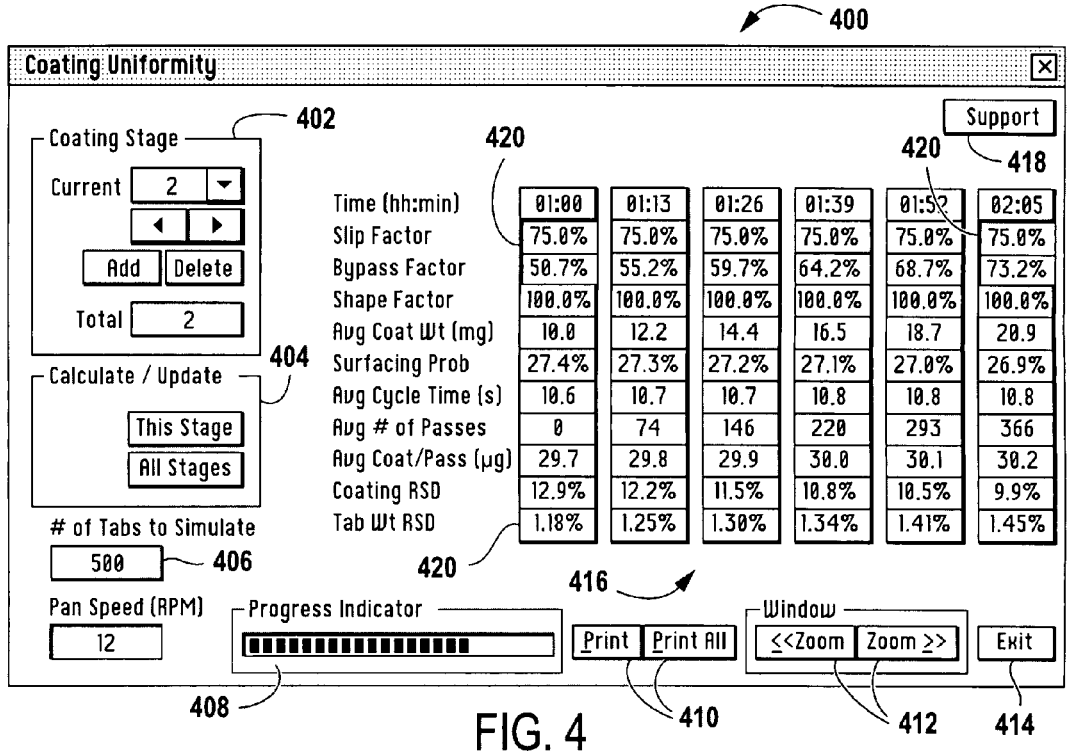
FIG. 4 is an alternative exemplary GUI for supplying parameters and viewing information in accordance with the present invention.

FIG. 4 depicts an alternative exemplary GUI 400. The GUI 400 illustrated in FIG. 4 enables control of one or more parameters in accordance with the present invention during different time periods (stages) of a simulation and, thus, enables dynamic control of the simulation. The GUI 400 includes a coating stage block 402, a calculate/update block 404, a tablet number input block 406, a progress indicator 408, print buttons 410, zoom buttons 412, an exit simulation button 414, result fields 416, a technical support button 418, and stage input fields 420. In an exemplary embodiment, each stage is divided into five equally split time segments. The GUI 400 simultaneously displays six time periods (i.e., columns including the result and stage input fields) for a selected stage that correspond to the start and end of each of these five segments.

The coating stage block 402 includes functionality for adding and removing stages. In addition, the coating stage block 402 displays the total number of stages, displays the current stage, and enables cycling through stages. The calculate/update block 404 provides functionality for executing (running) select stages of a simulation or all stages. The exit simulation button 414 enables termination of the simulation.

The tablet number input block 406 enables input of the number of simulation tablets. The progress indicator 408 indicates progress of the simulation. For example, in the illustrated embodiment there are six discrete display sections that provide an indication of completion. If the simulation is halfway through its calculations, three of the six discrete display sections will be distinguishable from the remaining display sections to provide an indication of the status. The print buttons 410 enable printing of the GUI 400 or all GUI's associated with the simulation. The zoom buttons enable the GUI 400 to be reduced or enlarged on a computer screen (not shown). The technical support button 418 enables technical support functionality.

The result fields 416 display results at various stages of the simulation. Exemplary results include average number of passes per tablet, average coating amounts per pass, an intermediate/final tablet RSD. The stage input fields 420 enable the input of values for the simulation. Exemplary input values include slip factor, bypass factor, and initial tablet RSD. In an exemplary embodiment, pan speed can be input for each stage, initial tablet RSD can be input at the start of a first stage and slip and bypass factors can be input at the start and end of each stage.

Figure 5:
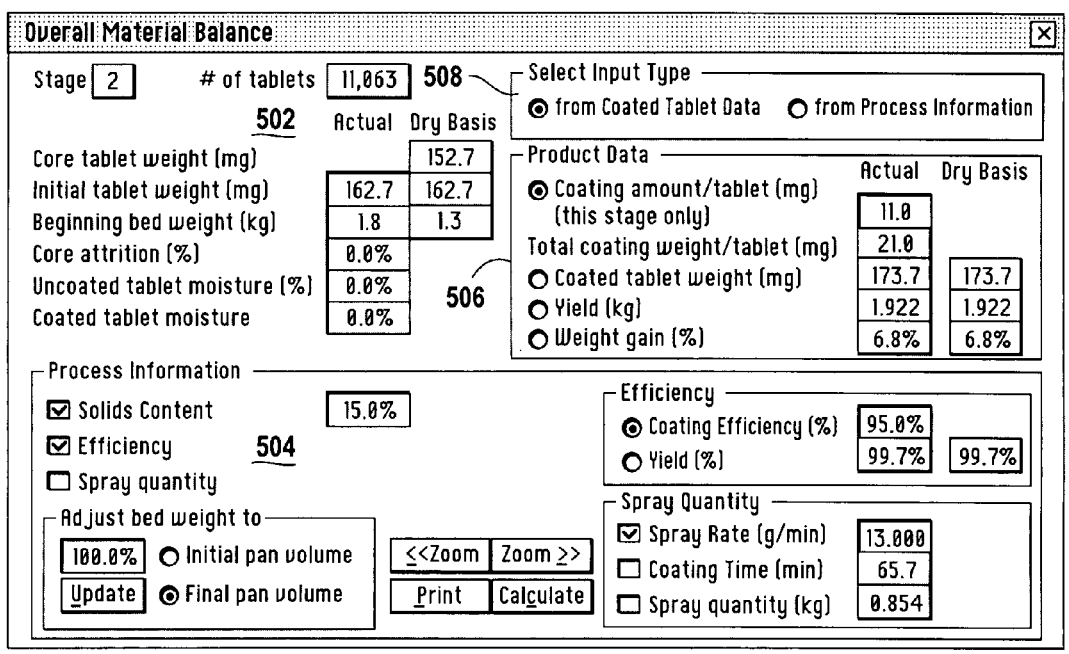
FIG. 5 is a GUI for supplying and calculating overall material balance parameters in accordance with the present invention.
Figures 6, 7A:
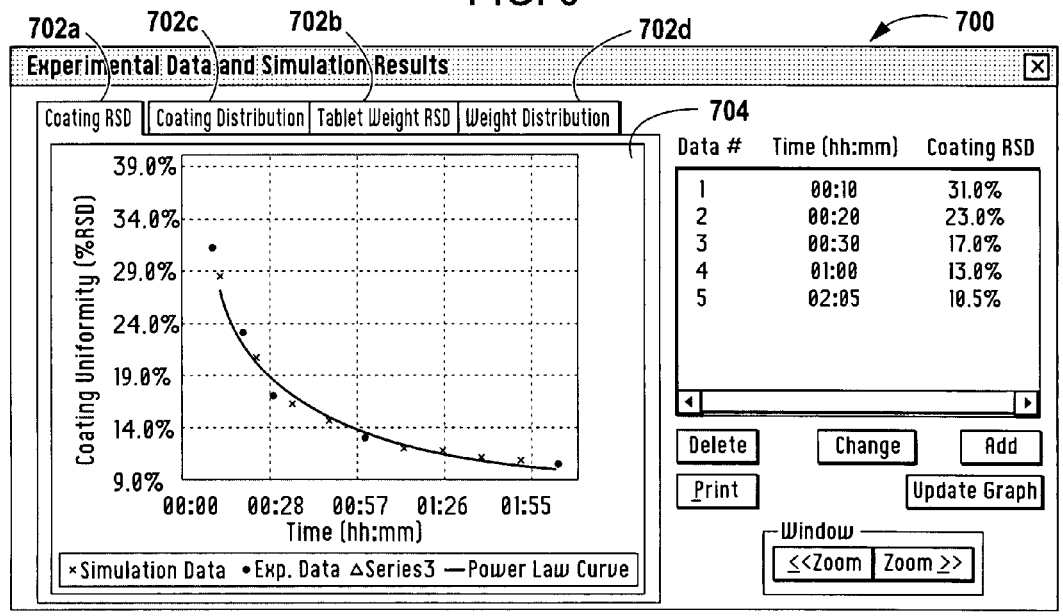
FIG. 6 is a GUI for supplying and calculating pan and bed shape parameters in accordance with the present invention.
FIG. 7A is a GUI displaying a coating RSD graph in accordance with the present invention.
Figure 7B:
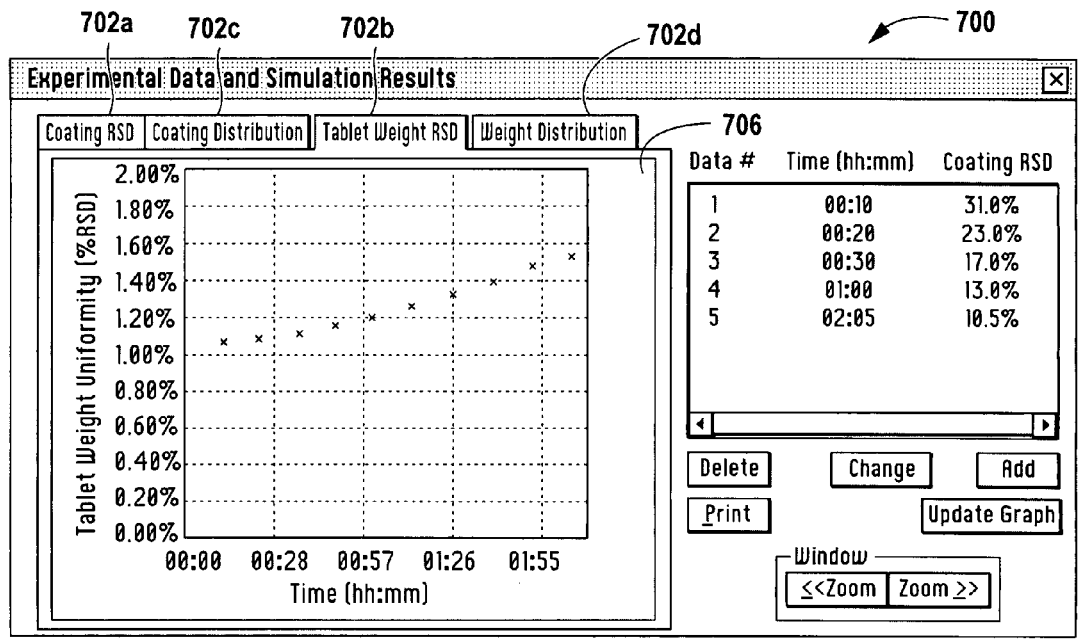
FIG. 7B is a GUI displaying a tablet weight RSD graph in accordance with the present invention.
Figure 7C:
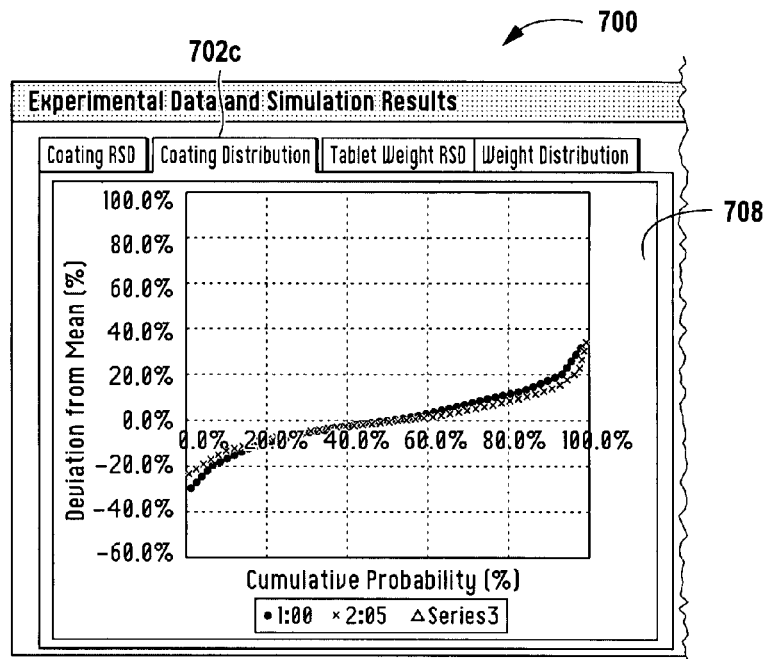
FIG. 7C is a GUI displaying a coating distribution graph in accordance with the present invention.
Figure 7D:
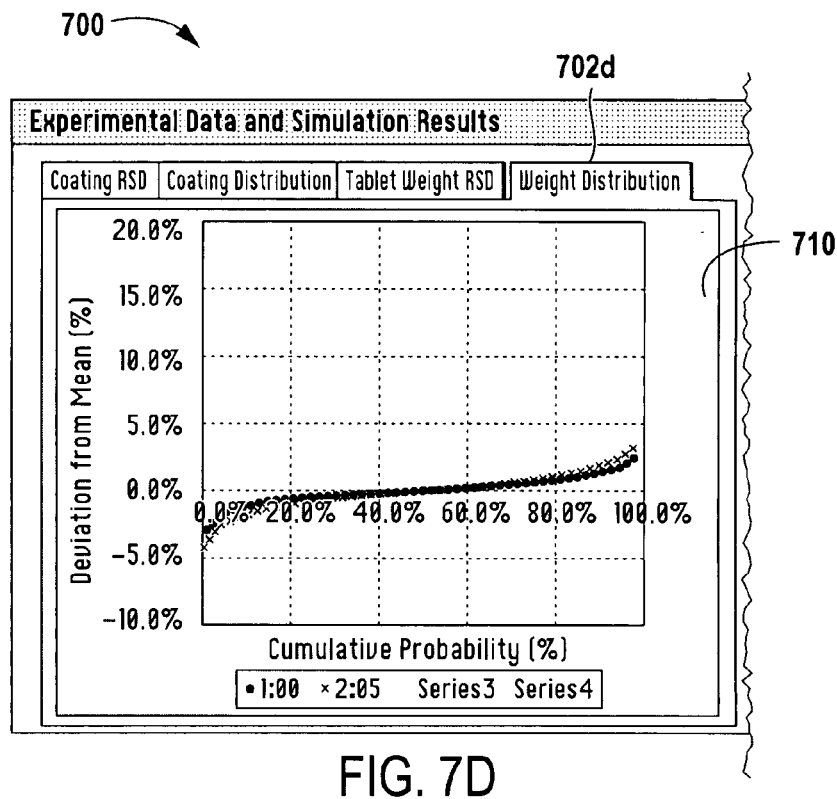
FIG. 7D is a GUI displaying a weight distribution graph in accordance with the present invention.

FIG. 5 depicts an exemplary material balance GUI 500 and FIG. 6 depicts an exemplary pan and bed shape GUI 600. The material balance GUI 500 and the pan and bed shape GUI 600 enable the input of parameters and display of calculated material balances for the tablets, tablet bed, and coating solution, while accounting for pan geometry. In an exemplary embodiment, the GUIs 500/600 enable input and/or calculation of weight and density for coated and uncoated tablets (except initial tablet weight), yield and coating efficiency for the simulation process, weight and volume for a coated and uncoated bed, porosity and density for a coated and uncoated bed, coating weight, and coating weight gain. In addition, the GUIs 500/600 enable input of coated and uncoated tablet moisture, initial tablet weight, and shape and core attrition/friability. Further, the GUIs 500/600 enable calculation of coated and uncoated bed surface area and depth and coating thickness.

The GUI 500 illustrated in FIG. 5 includes an input parameter field 502 for receiving parameters such as core tablet weight, initial tablet weight, beginning bed weight, core attrition, uncoated tablet moisture, and coated table moisture. In addition, the GUI 500 includes process fields 504 for receiving process related information (e.g., solids content, efficiency, spray quantity, bed weight, etc.) and product data fields 506 for receiving product information (e.g., coating amount per tablet, total coating weight per tablet, coated tablet weight, yield, weight gain, etc.). The product data field includes total tablet weight and coating weight specifications. The tablet weight can be specified in total coated bed weight ("yield") or individual tablet weight ("coated tablet weight"). Coating weight can be specified in percentage of the initial core weight ("weight gain") or coating weight ("coating amount/tablet"). A selection field 508 allows either the process information or the product information to be selected for the simulation. When the process information is selected, product information is calculated based on the process information and, when the product information is selected, process information is calculated based on the product information. In an exemplary embodiment, a beginning bed weight and a product yield may be calculated based on either an initial pan volume or a final pan volume selection selected via the GUI 500.

The GUI 600 illustrated in FIG. 6 includes a shape factor estimator 602 that estimates shape factor for a spheroid-shaped tablet. Shape factor is defined as the surface area of a sphere having the same volume as the tablet divided by the surface area of an actual tablet for simulation. Alternatively, the shape factor may be input directly into a field within the GUI 600. The GUI 600 further includes a initial and final tablet bed field 604. In an exemplary embodiment, either volume or density information is provided for two of bed, void, and tablets via the GUI 600 in addition to other inputs entered via GUI 500 to perform the simulation.

The GUI 600 illustrated in FIG. 6 further includes a bed geometry and dimension field 606. In the bed field 606, the following parameters are illustrated: diameter of a front door (FD), diameter of the pan (D), diameter of an end cap (BD), length of a front conical section (FC), length of the cylindrical section (C), and length of a back conical section (BC). Equipment dimensions can be loaded by specifying the equipment model or can be input manually.

FIGS. 7A-7D depict various graphs within a GUI 700. The GUI 700 includes tabs (represented by tabs 702a-d) for selecting graphs that display simulation information. When a coating RSD tab 702a is selected, a coating RSD graph 704 (FIG. 7A) is presented for displaying coating RSD information. When a tablet weight RSD tab 702b is selected, a tablet weight RSD graph 706 (FIG. 7B) is presented for displaying tablet weight RSD information. When a coating distribution tab 702c is selected, a coating distribution graph 708 (FIG. 7C) is presented for displaying tablet weight RSD information. When a weight distribution tab 702d is selected, a weight distribution graph 710 (FIG. 7D) is presented displaying weight distribution information.

Pan coating process simulations in accordance with the present invention are useful for process performance bridging, optimizing laboratory processes, scaling-up and transferring between different equipment, trouble shooting, qualifying equipment, improving equipment design, and assisting in the generation of process analytical technology (PAT) applications. Increasing tablet coating capacity (scaling-up) has an adverse impact on coating uniformity. Increasing batch size, bulk density, or spray rate results in less uniformly coated products. Similarly, maintaining geometric similarity results in less uniformly coated product if the pan diameter is increased when scaling up. Therefore, mapping RSD is useful to understanding how a process scales up and in optimizing the scaled up process.

Process performance bridging involves running several test batches of tablets to confirm product specifications for every new product. Typically, tests are conducts using process conditions that are supplied by a scientist based on experience (e.g., educated guesses), followed by minor adjustments to optimize the process. These tests are costly if production tablets and/or coating materials are used and time-consuming if several adjustments are made.

The present invention is now applied to process performance bridging. In an exemplary embodiment, at least one of a bypass probability distribution and a slip factor are modified to fit the experimental RSD coating data. Ideally, a "surfacing frequency" is determined for a tablet using a tracer technique, from which the slip value (S) is calculated in a manner that will be understood by one of skill in the art. Similarly, the bypass probability may also be obtained from spray characterization studies and equating the bypass factor to that corresponds to the standard deviation of the coating per pass distribution as outlined above. In an alternative exemplary embodiment, both the slip and the bypass probability distribution are fitted. In this case, multiple solutions exist. Process ranging experiments are first conducted to estimate the variability of the bypass probability distribution value. Coating RSD is then measured using at least about 20 tablets sampled at a plurality of time points (e.g., four or more). In an exemplary embodiment, the tests are conducted on new equipment during the equipment qualification as a performance mapping routine (i.e., an equipment benchmark). The same tablet core and coating materials should be used for benchmarking performances of different equipment.

Once the probability variables are mapped for the equipment, the present invention may be used to predict the operating conditions for the equipment needed to achieve a target coating RSD and level of "robustness." Even if there is variability associated with the fitted probability values, scale-up and/or transfer efforts may be greatly reduced since the present invention provides direction for meeting the desired RSD.

Additionally, the present invention may be used for process control variable specification and for troubleshooting. The ranges specified for control variables can be checked for their impact on the RSD using the present invention. For troubleshooting, if the RSD varies considerably in one of the manufacturing batches, the present invention may be used to screen out the process variables that impact the RSD.

The present invention may also be used to assist in system design changes. Equipment design changes are often driven by obsolete equipment parts or continuous improvements. The physical meanings associated with the probability variables allow decoupling of the mixing-effectiveness and the spray-effectiveness benchmarks for assessing equipment changes. For example, since the bypass variable is directly impacted by a spray design change, the spray design effectiveness can be quantified by the bypass probability distribution value. Similarly, changes to the baffle design can be quantified with the slip value.

Figure 8:
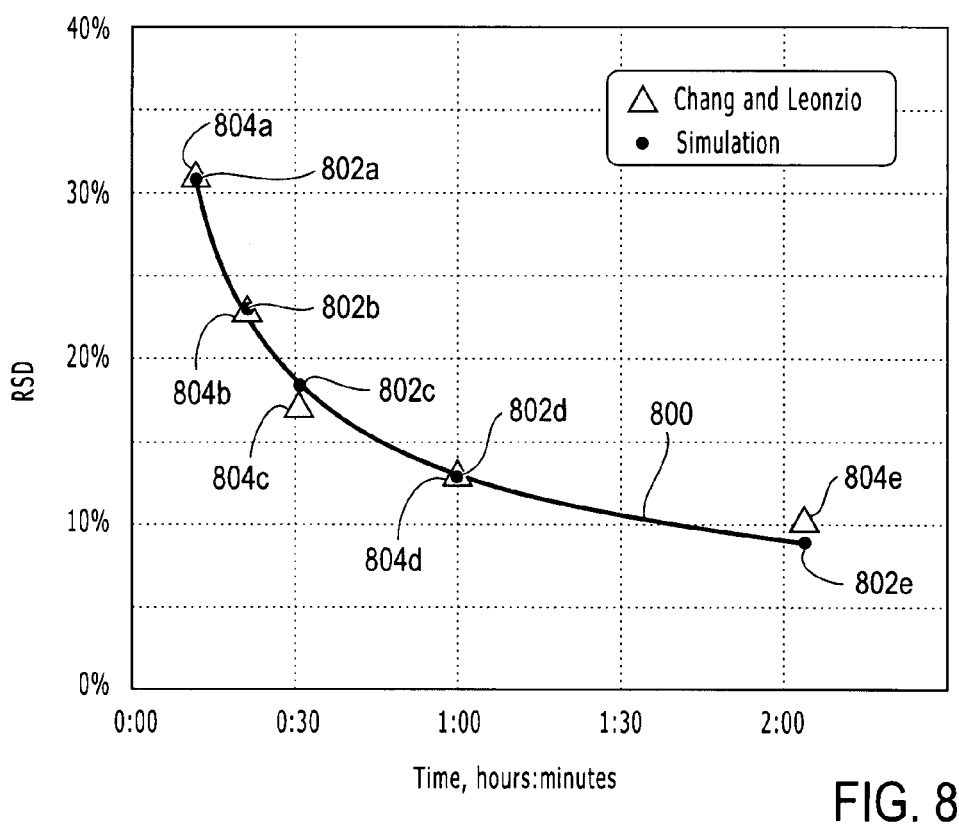
FIG. 8 is a graph illustrating relative standard deviation (RSD) versus time for comparing known data to results obtained in accordance with the present invention.

Simulation results are now provided to illustrate the effectiveness of the present invention. The simulation results are presented in TABLE 1 and in FIGS. 8-12, which are referenced by TABLE 1. Note—these results were obtained using "static" bed simulation without updating the changes in bed properties with time (i.e., block 212 is omitted in these calculations). TABLE 1 includes the parameters of nine (9) simulation runs (i.e., Runs 1-9) in accordance with the present invention. The slip (S) between the tablet bed and the pan and the fraction of tablets bypassing the spray zone (bypass probability distribution) were modified to fit experimental data as neither could be derived from the information given in the literature. Slip and bypass probability distribution each effect coating uniformity by changing the number of passes through the spray zone during a desired coating time. If the spray coverage is uniform across the width of the bed (e.g., bypass probability equals zero), then the corresponding slip factor that fits the data is 95% (Run 1 in TABLE 1, which is illustrated in FIG. 8). FIG. 8 depicts a curve 800 connecting data points 802a-e for Run 1. FIG. 8 also depicts non-connected data points 804a-e reported in *The Effect of Run Time on the Inter-Unit Uniformity of Aqueous Film Coating Applied to Glass Beads in a Hi-Coater* by Chang et al. published in Drug Dev Ind Pharm, 21 (1995), referred to herein as the base condition data points. If a 30% bypass probability distribution is assumed, then the slip factor that fits the data is 80% (Run 2 in TABLE 1).

TABLE 1

| Run | Figure | Spray Zone Bypass | Slip Factor | Coating Time (h:m) | Rotational Speed (RPM) | Tablet Size (mg) | Shape Factor | Pan Dia. | Load (kg) | Bulk Density (kg/m$^3$) |
|---|---|---|---|---|---|---|---|---|---|---|
| 1 | 4 | 0% | 95% | 2:05 | 12 | 153 | 100% | 13" | 1.7 | 1550 |
| 2 | 4 | 30% | 80% | 2:05 | 12 | 153 | 100% | 13" | 1.7 | 1550 |

TABLE 1-continued

| Run | Figure | Spray Zone Bypass | Slip Factor | Coating Time (h:m) | Rotational Speed (RPM) | Tablet Size (mg) | Shape Factor | Pan Dia. | Load (kg) | Bulk Density (kg/m³) |
|---|---|---|---|---|---|---|---|---|---|---|
| 3 | 5 | 0% | 95% | 4:00 | 12 | 153 | 100% | 13" | 1.7 | 1550 |
| 4 | 5 | 0% | 95% | 2:05 | 24 | 153 | 100% | 13" | 1.7 | 1550 |
| 5 | 6 | 0% | 95% | 2:05 | 12 | 300 | 100% | 13" | 1.7 | 1550 |
| 6 | 6 | 0% | 95% | 2:05 | 12 | 153 | 79% | 13" | 1.7 | 1550 |
| 7 | 7 | 0% | 95% | 2:05 | 12 | 153 | 100% | 15" | 10.7 | 1550 |
| 8 | 7 | 0% | 95% | 2:05 | 12 | 153 | 100% | 13" | 1.1 | 1550 |
| 9 | 8 | 0% | 95% | 2:05 | 12 | 153 | 100% | 13" | 1.7 | 1000 |

Figure 9:
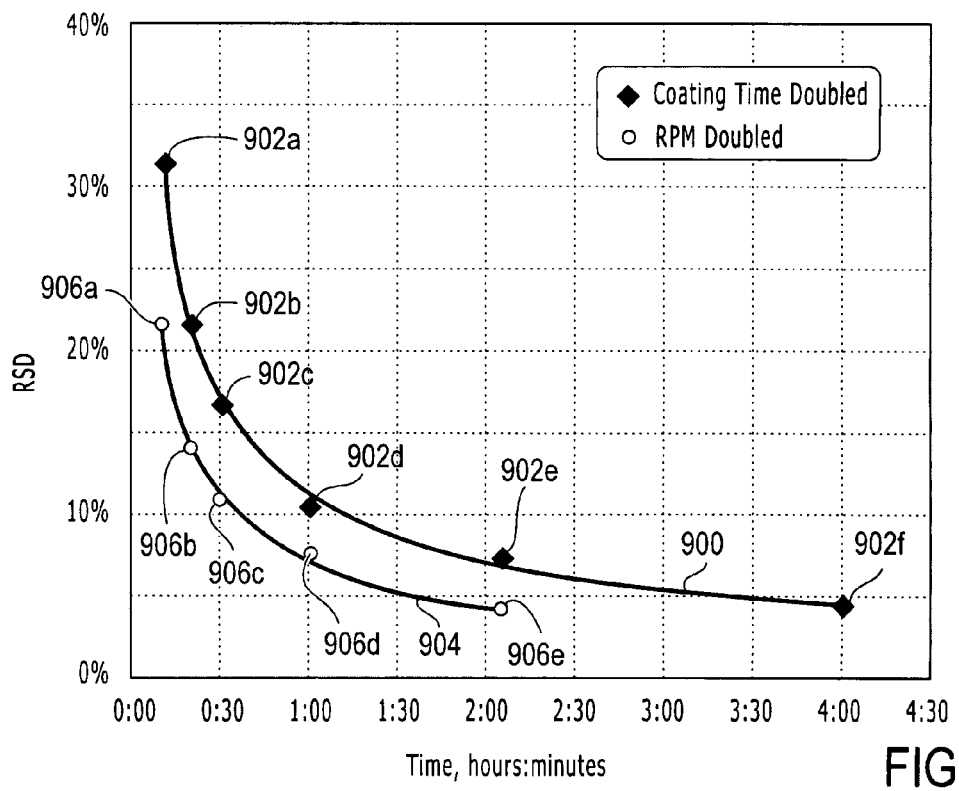
FIG. 9 is a graph illustrating the effect of doubling the coating time and the pan speed on RSD in accordance with the present invention.

Using the same coating condition as Run 1 in TABLE 1, Runs 3 and 4 were conducted for twice the coating time and twice the pan rotation speed, respectively. FIG. 9 depicts a coating time doubled curve 900 connecting data points 902a-f for Run 3 and an RPM doubled curve 904 connecting data points 906a-e for Run 4. The RSD results for Runs 3 and 4 indicate that both pan speed and coating time may have a similar effect on the final RSD. In practice, the slip (S) may change with the pan speed, while large weight gains and coating attrition may alter the effect of coating time on the RSD of the coating. Block 212 permits these changes to be incorporated into the simulation.

Figure 10:
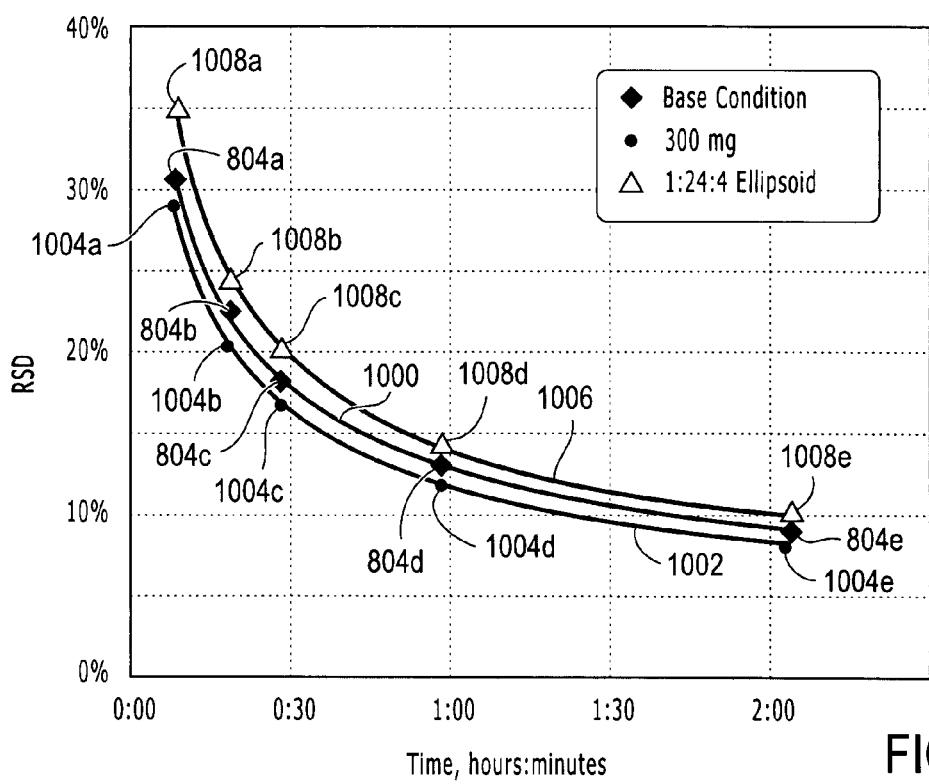
FIG. 10 is a graph illustrating the effect of tablet size and shape on RSD in accordance with the present invention.
Figure 11:
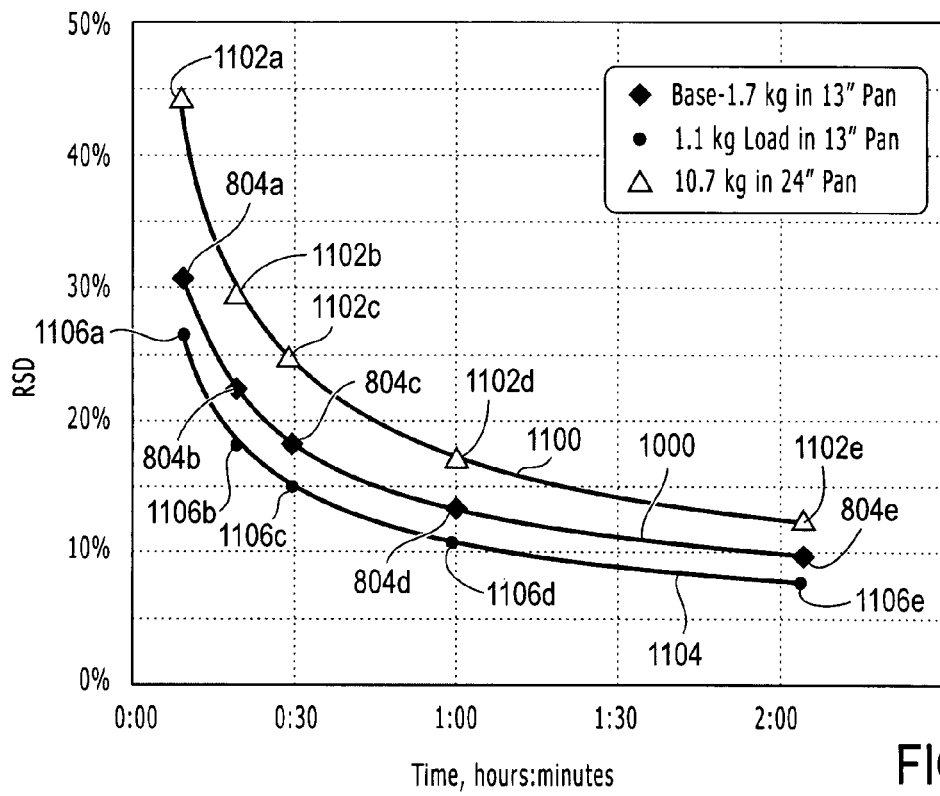
FIG. 11 is a graph illustrating the effect of load size and pan size on RSD in accordance with the present invention.
Figure 12:
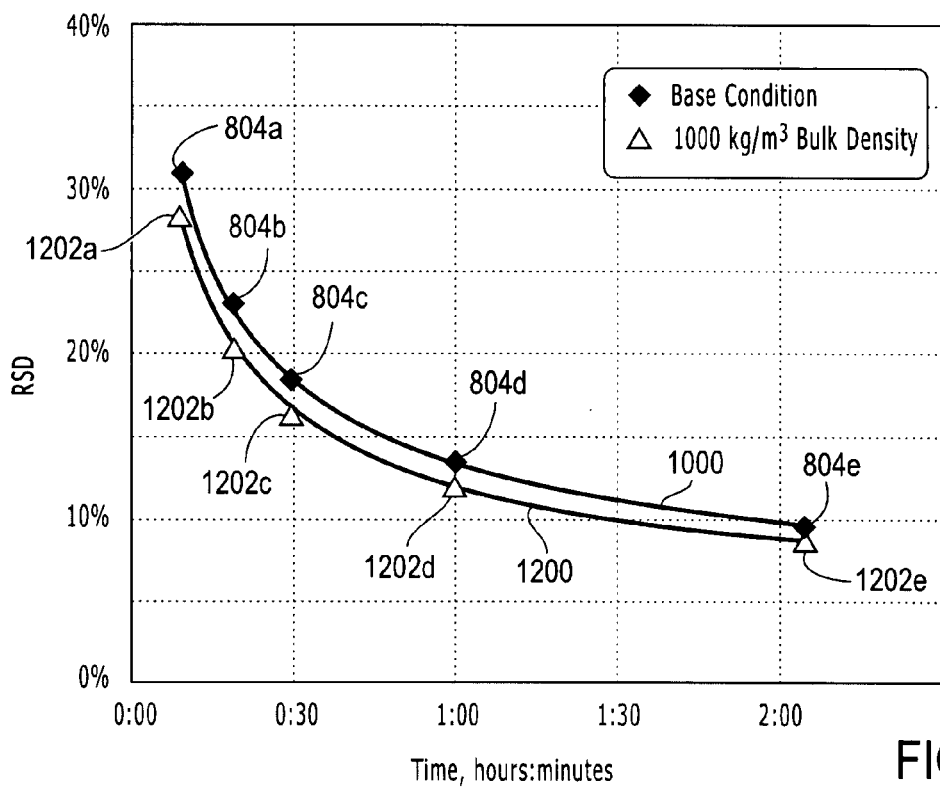
FIG. 12 is a graph illustrating the effect of bulk density (void fraction) on RSD in accordance with the present invention.

FIG. 10 illustrates the effect of doubling the tablet size and changing the shape from spherical (i.e., a 100% shape factor) to elliptical (e.g., a 79% shape factor) on the RSD of the coating. FIG. 10 depicts a base condition curve 1000 connecting the base condition data points 804a-e, an increased tablet size curve 1002 connecting Run 5 data points 1004a-e, and a decreased shape factor curve 1006 connecting Run 6 data points 1008a-e. Increasing the tablet size and/or the shape factor decreases the spray droplet concentration gradient. Reducing the concentration gradient results in a larger simulation spray zone, which in turn reduces the RSD of the coating.

FIG. 11 illustrates that reducing the tablet load from 1.7 kg to 1.1 kg decreases the RSD of the coating. FIG. 11 depicts a base condition curve 1000 connecting the base condition data points 804*a-e*, an increased pan diameter curve 1100 connecting Run 7 data points 1102*a-e*, and a reduced load curve 1104 connecting Run 8 data points 1106*a-e*. A smaller bed load has a larger spray surface area relative to its volume. Thus, the probability of surfacing decreases for a larger bed load—resulting in less uniform coating.

FIG. 11 further illustrates the effect of pan diameter and width. Using a simulation in accordance with the present invention, pan diameter and width were first each set to 13" and, then, each set to 24". To maintain geometric similarity (i.e., an equal percent fill level), spray rate, total spray, load, and yield were multiplied by (24/13)*3 when increasing the pan diameter and width from 13" to 24". Coating uniformity decreases for a larger pan (e.g., the 24" diameter pan), which is consistent with the surface to volume changes for scale-ups involving geometric similarity. For example, bed surface area increases at a lower rate than the bed volume as the pan size gets larger. Since the volume of the spray zone is proportional to the bed surface area, its size relative to the pan volume decreases as the pan diameter increases. In Runs 7 and 8, the pan rotation rate (RPM) was kept constant. It should be noted, however, that keeping the pan rotation rate constant may not be practical when scaling up, since tablet speed, and thus attrition rate, increases with pan diameter. If the pan rotation rate is decreased while maintaining geometric similarity when scaling up, these actions may have a negative compounding effect on the coating uniformity (i.e., the RSD value may increase).

FIG. 12 illustrates the effect of changing the bulk density. FIG. 12 depicts a base condition curve 1000 connecting the base condition data points 804*a-e* and a reduced bulk density curve 1200 connecting Run 9 data points 1202*a-e*. Bulk density, or loose-packed density, affects RSD in two ways. First, bed volume increases as bulk density decreases, which increases the cycle time. Accordingly, the tablets make fewer passes through the spray zone in the same period of time, which increases the RSD of the coating. Decreasing the density, however, increases the void fraction in the tablet bed, which decreases the spray droplet concentration gradient and, thus, the RSD. Under the operating conditions specified for Run 9 illustrated in FIG. 12, the bulk density improves the coating uniformity, which decreases the RSD of the coating.

The steps of the present invention may be implemented in software on a computer (not shown). This software may be embodied in a computer readable carrier, for example, a magnetic or optical disk, a memory-card or an audio frequency, radio-frequency, or optical carrier wave.

Although the invention is illustrated and described herein with reference to specific embodiments, the invention is not intended to be limited to the details shown. For example, the use of the phrase "randomly select," and derivatives thereof, are meant to encompass both random and pseudo-random number selections. Various other modifications may be made in the details within the scope and range of equivalents of the claims and without departing from the invention.

What is claimed:

1. A method for simulating a pan coating process to estimate at least one of tablet coating uniformity or coated tablet weight uniformity for a plurality of tablets, the pan coating process cycling the plurality of tablets within a tablet bed In a pan, the method comprising the steps of:

(i) obtaining a plurality of parameters associated with the pan coating process, the plurality of parameters including a tablet path distribution corresponding to the tablet bed in the pan;

(ii) randomly selecting, via a Monte Carlo simulation method, a tablet path for each cycle of a simulation tablet within the tablet bed;

(iii) calculating a coating amount for at least one cycle of the simulation tablet based on the selected tablet path; and (iv) summing the calculated coating amounts for the at least one cycle of the simulation tablet: to produce a tablet coating weight;

(v) repeating steps (ii)-(iv) for each of a defined number Of simulation tablets representing the plurality of tablets;

(vi) determining at least one of tablet coating uniformity or coated tablet weight uniformity for the plurality of tablets based at least in part on the tablet coating weight for each of the simulation tablets; and (vii) setting operating conditions of pan coating equipment based on the plurality of parameters and at least one of the determined tablet coating uniformity or the determined coated tablet weight uniformity for the plurality of tablets;

wherein the pan has a shape including at least one cylindrical portion and at least one non-cylindrical portion and the tablet bed has an associated shape corresponding to the shape of the pan and wherein the tablet path distribution is a volume based distribution corresponding to the associated shape of the tablet bed.

2. The method of claim 1, wherein the plurality of parameters further includes a desired coating time and a cycle time distribution and wherein the method further comprises the steps of:

(iiiA) randomly assigning, via a Monte Carlo simulation method, a cycle time to each cycle of the simulation tablet;

(iiiB) summing the cycle times assigned to each cycle; and (iiiC) repeating steps: (ii)-(iv), (iiiA), and (iiiB), until a sum of the cycle times from step (iiiB) is greater than or equal to the desired coating time to identify a number of cycles for the simulation tablet;

wherein the tablet coating weight Is based further on the number of cycles of the tablet.

3. The method of claim 1, further comprising the steps of:
randomly selecting a tablet weight for each simulation tablet; and calculating a coated tablet weight for each simulation tablet based on the tablet weight and the summed coating amounts for each simulation tablet.

4. The method of claim 3, wherein the determining step comprises the step of:

determining coated tablet weight uniformity based an the calculated coated tablet weight for each simulation tablet.

5. The method of claim 1, wherein the determining step comprises the step of:

determining the relative standard deviation for the plurality of tablets based on the determined coating amount for each of the simulation tablets.

6. The method of claim 1, wherein the plurality of parameters includes at least one target coating property for the plurality of tablets and wherein the calculating step is further based an the at least one target coating property.

7. The method of claim 1, wherein the randomly selecting step further comprises the step of:

randomly selecting a tablet location within the tablet bed at least substantially perpendicular to a surface of the tablet bed based on a volume of the tablet bed.

8. A method for simulating a pan coating process to estimate at least one of tablet coating uniformity or coated tablet weight uniformity for a plurality of tablets, the pan coating process cycling the plurality of tablets within a tablet bed in a pan, the method comprising the steps of:

(i) obtaining a plurality of parameters associated with the pan coating process, the plurality of parameters including a tablet path distribution corresponding to the tablet bed in the pan;

(ii) randomly selecting, via a Monte Carlo simulation method, a tablet path for each cycle of a simulation tablet within the tablet bed;

(iii) calculating a coating amount for at least one cycle of the simulation tablet based on the selected tablet path; and (iv) summing the calculated coating amounts for the at least one cycle of the simulation tablet to produce a tablet coating weight;

(v) repeating steps (ii)-(iv) for each of a defined number of simulation tablets representing the plurality of tablets;

(vi) determining at least one of tablet coating uniformity or coated tablet weight uniformity for the plurality of tablets based at least in part on the tablet coating weight for each of the simulation tablets; and (vii) setting operating conditions of pan coating equipment based on the plurality of parameters and at least one of the determined tablet coating uniformity or the determined coated tablet weight uniformity for the plurality of tablets;

wherein the plurality of parameters further includes a tablet bypass distribution for bypassing a simulation spray zone associated with the tablet bed in the pan and wherein the calculating step comprises the steps of:

(iiiA) randomly selecting whether the simulation tablet passes through the simulation spray zone or bypasses the simulation spray zone in accordance with the tablet bypass distribution for each cycle of the tablet: and (iiiB) calculating a coating amount for each cycle of the simulation tablet passing through the simulation spray zone, wherein a coating amount is not calculated for each cycle of the simulation tablet that bypasses the simulation spray zone.

9. The method of claim 8, wherein the tablet bypass distribution is determined by performing the steps of:

converting an actual spray distribution on a surface of the tablet bed to a coating per cycle distribution;

determining a binary coating per cycle distribution having a standard deviation matching a standard deviation of the coating per cycle distribution; and calculating the tablet bypass distribution based on the determined coating per cycle distribution.

10. A method for simulating a pan coating process to estimate at least one of tablet coating uniformity or coated tablet weight uniformity for a plurality of tablets, the pan coating process cycling the plurality of tablets within a tablet bed in a pan, the method comprising the steps of:

(i) obtaining a plurality of parameters associated with the pan coating process, the plurality of parameters including a tablet path distribution corresponding to the tablet bad in the pan;

(ii) calculating the size of the tablet bed for each cycle of the simulation tablet;

(iii) randomly selecting, via a Monte Carlo simulation method, a tablet path for each cycle of a simulation tablet within the tablet bed wherein the randomly selected tablet path is based at least in part on the calculated size of the tablet bed;

(iv) calculating a coating amount: for at least one cycle of the simulation tablet based on the selected tablet path; and (v) summing the calculated coating amounts for the at least one cycle of the simulation tablet to produce a tablet coating weight;

(vi) repeating steps (ii)-(v) for each of a defined number of simulation tablets representing the plurality of tablets;

(vii) determining at least one of tablet: coating uniformity or coated tablet weight uniformity for the plurality of tablets based at least in part on the tablet coating weight for each of the simulation tablets; and (viii) setting operating conditions of pan coating equipment based on the plurality of parameters and at least one of the determined tablet coating uniformity or the determined coated tablet weight uniformity for the plurality of tablets.

11. A method for simulating a pan coating process to estimate at least one of tablet coating uniformity or coated tablet weight uniformity for a plurality of tablets, the pan coating process cycling the plurality of tablets within a tablet bed in a pan, the method comprising the steps of:
   (i) obtaining a plurality of parameters associated with the pan coating process, the plurality of parameters including a tablet path distribution corresponding to the tablet bed In the pan;
   (ii) randomly selecting, via a Monte Carlo simulation method, a tablet path for each cycle of a simulation tablet within the tablet bed;
   (iii) calculating a coating amount for at least one cycle of the simulation tablet based on the selected tablet path; and
   (iv) summing the calculated coating amounts for the at least one cycle of the simulation tablet to produce a tablet coating weight;
   (v) repeating steps (ii)-(iv) for each of a defined number of simulation tablets representing the plurality of tablets;
   (vi) determining at least one of tablet coating uniformity or coated tablet weight uniformity for the plurality of tablets based at least in part on the tablet coating weight for each of the simulation tablets; and
   (vii) setting operating conditions of pan coating equipment based on the plurality of parameters and at least one of the determined tablet coating uniformity or the determined coated tablet weight uniformity for the plurality of tablets;
   wherein the step of calculating a coating amount is based on a slip factor corresponding to a rotational movement of the tablet bed relative to the pan.

12. The method of claim 11, wherein the step of calculating a coating amount includes the step of solving:

$$M_{ij} = K \frac{e^{-\frac{1.5*(1-\varepsilon)}{d_v \psi \varepsilon}z}}{D-z};$$

wherein K is calculated by solving $$\frac{K}{N_{sim}} \cdot \sum_{i=1}^{N_{sim}} \sum_{j=1}^{N_{cyc}} \frac{e^{-\frac{1.5 \cdot (1-\varepsilon)}{d_v \psi \varepsilon}z}}{D-z} = \frac{C_{tot}}{N_{tab}}; \text{ and}$$

wherein $N_{sim}$ is the total number of simulation tablets, $N_{cyc}$ is the total number of cycles an ith tablet cycles through an actual spray zone, $N_{tab}$ is the plurality of tablets, $C_{tot}$ is the total amount of coating deposited onto the plurality of tablets, D is a diameter of the pan diameter, z is a coating solution penetration depth into the tablet bed, $\varepsilon$ is a loose-packed void fraction of the tablet bed, $d_v$ is a diameter of a sphere having the same volume as on of the plurality of tablets, and $\psi$ is a surface area of a sphere having the same volume as one of the plurality of tablets divided by the surface area of one of the plurality of tablets.

13. A method for simulating a pan coating process to estimate at least one of tablet coating uniformity or coated tablet weight uniformity for a plurality of tablets, the pan coating process cycling the plurality of tablets within a tablet bed In a pan, the method comprising the steps of:
   (i) obtaining a plurality of parameters associated with the pan coating process, the plurality of parameters including a desired coating time, a cycle time distribution, and a tablet bypass distribution for bypassing a simulation spray zone associated with the tablet bed;
   (ii) randomly assigning via a Monte Carlo simulation method, a cycle time for each cycle of a simulation tablet;
   (iii) summing the cycle times assigned to each cycle;
   (iv) randomly selecting whether the simulation tablet passes through the simulation spray zone or bypasses the simulation spray zone in accordance with the tablet bypass distribution for each cycle of the simulation tablet;
   (v) calculating a cycle coating amount only for cycles of the simulation tablet passing through the simulation spray zone;
   (vi) repeating steps (ii)-(v) until a sum of the cycle times from step (iii) is greater than or equal to the desired coating time to identify a number of cycles for the simulation tablet;
   (vii) determining a tablet coating weight for the simulation tablet based on the number of cycles and the cycle coating amounts;
   (viii) repeating steps: (ii)-(vii) far each of a defined number of simulation tablets representing the plurality of tablets;
   (ix) determining at least one of tablet coating uniformity or coated tablet weight uniformity for the plurality of tablets based at least in part on the tablet coating weight for each of the simulation tablets; and
   (x) setting operating conditions of pan coating equipment based on the plurality of parameters and at least one of the determined tablet coating uniformity or the determined coated tablet weight uniformity for the plurality of tablets.

14. The method of claim 13, wherein the plurality of parameters includes a cycle coating amount and wherein the step of determining the tablet coating weight comprises the step of:
   multiplying the cycle coating amount by the number of cycles for the simulation tablet.

15. The method of claim 13, wherein the plurality of parameters includes a cycle coating amount and wherein the step of determining the tablet coating weight comprises the step of:
   summing the cycle coating amounts for each cycle of the simulation tablet.

16. The method of claim 13, wherein the tablet bypass distribution is determined by performing the steps of:
   converting an actual spray distribution on a surface of the tablet bed to a coating per cycle distribution;
   determining a binary coating per cycle distribution having a standard deviation matching a standard deviation of the coating per cycle distribution; and
   calculating the tablet bypass distribution based on the determined coating per cycle distribution.

17. The method of claim 13, wherein the randomly selecting step further comprises the step of:
   randomly selecting a tablet location within the tablet bed at least, substantially perpendicular to a surface of the tablet bed based on a volume of the tablet bed.

18. The method of claim 13, wherein the plurality of parameters further include a tablet path distribution corresponding to the tablet bed in the pan and wherein the determining step comprises the steps of:

randomly selecting via a Monte Carlo simulation method, a tablet path for each cycle of a simulation tablet within the tablet bed in the pan; and calculating a coating amount for at least one cycle of the tablet based on the selected tablet path;

wherein the tablet coating weight is based further on the calculated coating amounts.

19. A magnetic disk, optical disk or memory card, including software that is configured to control a computer to implement a method for simulating a pan coating process to estimate at least one of tablet coating uniformity or coated tablet weight uniformity for a plurality of tablets, the pan coating process cycling the plurality of tablets within a tablet bed in a pan, the method comprising the steps of:

(i) obtaining a plurality of parameters associated with the pan coating process, the plurality of parameters including a tablet path distribution corresponding to the tablet bed in the pan;

(ii) randomly selecting via a Monte Carlo simulation method, a tablet path for each cycle of a simulation tablet within the tablet bed;

(iii) calculating a coating amount for at least one cycle of the simulation tablet based on the assigned tablet path;

(iv) summing the calculated coating amounts for the at least one cycle of the simulation tablet to produce a tablet coating weight;

(v) repeating steps (ii)-(iv) for each of a defined number of simulation tablets representing the plurality of tablets;

(vi) determining at least one of tablet coating uniformity or coated tablet weight uniformity for the plurality of tablets based at least in part on the tablet coating weight for each of the simulation tablets; and (vii) setting operating conditions of pan coating equipment based on the purality of parameters and at least one of the determined tablet coating uniformity or the determined coated tablet weight uniformity for the plurality of tablets;

wherein the pan has a shape including at least one cylindrical portion and at least one non-cylindrical portion and the tablet bed has an associated shape corresponding to the shape of the pan and wherein the tablet path distribution is a volume based distribution corresponding to the associated shape of the tablet bed.

20. The magnetic disk, optical disk or memory card of claim 19, wherein the plurality of parameters further include a tablet bypass distribution for bypassing a simulation spray zone associated with the tablet bed in the pan and wherein the calculating step for implementation by the computer comprises the steps of:

(iiiA) randomly selecting whether the simulation tablet passes through the simulation spray zone or bypasses the simulation spray zone in accordance with the tablet bypass distribution for each cycle of the simulation tablet; and (iiiB) calculating a coating amount for each cycle of the simulation tablet passing through the simulation spray zone, wherein a coating amount is not calculated for each cycle of the simulation tablet that bypasses the simulation spray zone.

21. The magnetic disk, optical disk or memory card of claim 19, wherein the plurality of parameters further include a desired coating time and a cycle time distribution and wherein the method implemented by the computer further comprises the steps of:

(iiiA) randomly assigning via a Monte Carlo simulation method, a cycle time to each cycle of the simulation tablet;

(iiiB) summing the cycle times assigned to each cycle; and (iiiC) repeating steps (ii)-(iv), (iiiA) and (iiiB), until a sum of the cycle times from step (iiiB) is greater than or equal to the desired coating time to identify a number of cycles for the simulation tablet;

wherein the tablet coating weight is based further on the number of cycles of the tablet.

22. The magnetic disk, optical disk or memory card of claim 19, wherein the method implemented by the computer further comprises the steps of:

randomly selecting a tablet weight for each simulation tablet; and calculating a coated tablet weight far each tablet based on the tablet weight and the calculated coating amounts for each simulation tablet.

23. The magnetic disk, optical disk or memory card of claim 22, wherein the determining step for implementation by the computer comprises the step of:

determining coated tablet weight uniformity based on the calculated coated tablet weight for each simulation tablet.

24. The magnetic disk, optical disk or memory card of claim 19, wherein the method implemented by the computer further comprises the step of:

calculating the size of the tablet bed for each cycle of the simulation tablet;

wherein the randomly selected tablet path is based at least in part on the calculated size of the tablet bed.

25. The magnetic disk, optical disk or memory card of claim 19, wherein the determining step for implementation by the computer comprises the step of:

determining the relative standard deviation far the plurality of tablets based on the determined coating amount for each of the simulation tablets.

26. The magnetic disk, optical disk or memory card of claim 19, wherein the step of calculating a coating amount for implantation by the computer is based on a slip factor corresponding to a rotational movement of the tablet bed relative to the pan.

27. The magnetic disk, optical disk or memory card of claim 26, wherein the step of calculating a coating amount for implementation by the computer includes the step of solving:

$$M_{ij} = K \frac{e^{-\frac{1.5*(1-\varepsilon)}{d_v \psi \varepsilon} z}}{D-z};$$

wherein K is calculated by solving $$\frac{K}{N_{sim}} \cdot \sum_{i=1}^{N_{sim}} \sum_{j=1}^{N_{cyc}} \frac{e^{-\frac{1.5 \cdot (1-\varepsilon)}{d_v \psi \varepsilon} z}}{D-z} = \frac{C_{tot}}{N_{tab}}; \text{ and}$$

wherein $N_{sim}$ is the total number of simulation tablets, $N_{cyc}$ is the total number of cycles an ith tablet cycles through an actual spray zone, $N_{tab}$ is the plurality of tablets, $C_{tot}$ is the total amount of coating deposited onto the plurality of tablets, D is a diameter of the pan diameter, z is a coating solution penetration depth into the tablet bed, $\varepsilon$ is a loose-packed void fraction of the tablet bed, $d_v$, is a diameter of a sphere having the same volume as on of the plurality of tablets, and $\psi$ is a surface area of a sphere having the same volume as one of the plurality of tablets divided by the surface area of one of the plurality of tablets.

28. A magnetic disk, optical disk or memory card of claim including software that is configured to control a computer to implement a method for simulating a pan coating process to estimate at least one of tablet coating uniformity or coated tablet weight uniformity for a plurality of tablets, the pan coating process cycling the plurality of tablets within a tablet bed in a pan, the method comprising the steps of:
  (i) obtaining a plurality of parameters associated with the pan coating process, the plurality of parameters including a desired coating time and a cycle time distribution, and a tablet bypass distribution for bypassing a simulation spray zone associated with the tablet bed;
  (ii) randomly assigning via a Monte Carlo simulation method, a cycle time for each cycle of a simulation;
  (iii) summing the cycle times assigned to each cycle;
  (iv) randomly selecting whether the simulation tablet passes through the simulation spray zone or bypasses the simulation spray zone in accordance with the tablet bypass distribution fur each cycle of the simulation tablet;
  (v) calculating a cycle coating amount only for cycles of the simulation tablet passing through the simulation spray zone;
  (vi) repeating steps (ii)-(v) until a sum of the cycle times from step (iii) is greater than or equal to the desired coating time to identify a number of cycles for the simulation tablet;
  (vii) determining a tablet coating weight for the simulation tablet based on the number of cycles;
  (viii) repeating steps (ii)-(vii) for each of a defined number of simulation tablets representing the plurality of tablets;
  (ix) determining at least one of tablet coating uniformity or coated tablet weight uniformity for the plurality of tablets based at least in part on the tablet coating weight for each of the simulation tablets; and
  (x) setting operating conditions of pan coating equipment based on the plurality of parameters and at least one of the determined tablet coating uniformity or the determined coated tablet weight uniformity for the plurality of tablets.

29. The magnetic disk, optical disk or memory card of claim 28, wherein the plurality of parameters includes a cycle coating amount and wherein the step of determining the tablet coating weight for implementation by the computer comprises the step of:
  multiplying the cycle coating amount by the number of cycles for the simulation tablet.

30. The magnetic disk, optical disk or memory card of claim 28, wherein the plurality of parameters includes a cycle coating amount and wherein step (v) for implementation by the computer comprises the step of:
  summing the cycle coating amounts for each cycle of the simulation tablet.

31. The magnetic disk, optical disk or memory card of claim 28, wherein the plurality of parameters further include a tablet path distribution corresponding to the tablet bed of the pan and wherein the determining step for implementation by the computer comprises the steps of:
  randomly selecting via a Monte Carlo simulation method, a tablet path for each cycle of the simulation tablet within the tablet bed; and
  calculating a coating amount for at least one cycle of the simulation tablet based on the assigned tablet path;
  wherein the tablet coating weight is further based on the calculated coating amounts.

* * * * *

UNITED STATES PATENT AND TRADEMARK OFFICE
CERTIFICATE OF CORRECTION

PATENT NO. : 7,634,390 B2 Page 1 of 1
APPLICATION NO. : 10/981812
DATED : December 15, 2009
INVENTOR(S) : Choi It is certified that error appears in the above-identified patent and that said Letters Patent is hereby corrected as shown below:

At Column 16, line 64, "...defined number Of" should read --...defined number of--.

At Column 17, line 26, "...coating weight Is..." should read --...coating weight is...--.

At Column 18, line 46, "bad in the pan;" should read --bed in the pan--.

At Column 20, line 26, "...(vii) far each..." should read --...(vii) for each...--.

At Column 21, line 34, "based on the purality..." should read --based on the plurality...--.

At Column 22, line 33, "...deviation far the plurality" should read --...deviation for the plurality--.

At Column 22, line 37, "implantation by the computer..." should read --implementation by the computer...--.

At Column 23, line 1, "...memory card of claim" should read --...memory card--.

At Column 23, line 19, "...distribution fur each..." should read --...distribution for each...--.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO.       : 7,634,390 B2
APPLICATION NO.  : 10/981812
DATED            : December 15, 2009
INVENTOR(S)      : Michael Choi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1204 days.

Signed and Sealed this

Twenty-first Day of December, 2010

David J. Kappos
*Director of the United States Patent and Trademark Office*